(12) United States Patent
Yasui et al.

(10) Patent No.: US 11,927,846 B2
(45) Date of Patent: Mar. 12, 2024

(54) LIQUID CRYSTAL DISPLAY DEVICE AND ELECTRONIC APPARATUS

(71) Applicant: SONY GROUP CORPORATION, Tokyo (JP)

(72) Inventors: Toshifumi Yasui, Tokyo (JP); Tsuyoshi Okazaki, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 60 days.

(21) Appl. No.: 17/625,591

(22) PCT Filed: Jul. 1, 2020

(86) PCT No.: PCT/JP2020/025774
§ 371 (c)(1),
(2) Date: Jan. 7, 2022

(87) PCT Pub. No.: WO2021/014907
PCT Pub. Date: Jan. 28, 2021

(65) Prior Publication Data
US 2022/0291544 A1    Sep. 15, 2022

(30) Foreign Application Priority Data

Jul. 19, 2019   (JP) .................................. 2019-133827
Jan. 17, 2020   (JP) .................................. 2020-006346

(51) Int. Cl.
*G02F 1/1335*   (2006.01)
*G02F 1/13363*  (2006.01)
*G02F 1/1343*   (2006.01)

(52) U.S. Cl.
CPC .. *G02F 1/133526* (2013.01); *G02F 1/133512* (2013.01); *G02F 1/133553* (2013.01);
(Continued)

(58) Field of Classification Search
None
See application file for complete search history.

(56) References Cited

U.S. PATENT DOCUMENTS 5,844,644 A * 12/1998 Oh ................... G02F 1/134363
                                                   349/95
2007/0200975 A1   8/2007 Kamijima
(Continued)

FOREIGN PATENT DOCUMENTS

CN    101021629 A    8/2007
EP    1818713 A1     8/2007
(Continued)

OTHER PUBLICATIONS

International Search Report and Written Opinion of PCT Application No. PCT/JP2020/025774, dated Sep. 15, 2020, 08 pages of ISRWO.

*Primary Examiner* — Ryan Crockett
(74) *Attorney, Agent, or Firm* — CHIP LAW GROUP

(57) ABSTRACT

A liquid crystal display device according to the present disclosure includes: a liquid crystal layer; a drive substrate including a light-shielding region and a transmissive region; a plurality of pixel electrodes that is transmissive and provided at a position corresponding to the transmissive region on the drive substrate; a counter substrate disposed to be opposed to the drive substrate with the plurality of pixel electrodes and the liquid crystal layer interposed therebetween; a first layer provided between the counter substrate and the liquid crystal layer and including a material having a first refractive index; and a second layer that is provided in at least a portion of a region corresponding to the light-shielding region in the first layer, includes a material having a second refractive index lower than the first refractive index, and has a rectangular cross-sectional shape in a thickness direction.

19 Claims, 31 Drawing Sheets

(52) U.S. Cl.
CPC .... *G02F 1/133638* (2021.01); *G02F 1/13439* (2013.01); *G02F 2413/01* (2013.01); *G02F 2413/05* (2013.01)

(56) References Cited

U.S. PATENT DOCUMENTS

| | | | |
|---|---|---|---|
| 2016/0282987 A1* | 9/2016 | Choi | G06F 3/0412 |
| 2018/0173048 A1 | 6/2018 | Ito et al. | |
| 2019/0187524 A1* | 6/2019 | Sugiura | H01L 27/1248 |
| 2021/0232010 A1* | 7/2021 | Numata | G02F 1/133519 |
| 2022/0299818 A1* | 9/2022 | Eguchi | G02F 1/133526 |
| 2023/0118579 A1* | 4/2023 | Nakano | G09F 9/00 349/95 |

FOREIGN PATENT DOCUMENTS

| | | |
|---|---|---|
| JP | 10-133203 A | 5/1998 |
| JP | 11-064836 A | 3/1999 |
| JP | 2007-249183 A | 9/2007 |
| JP | 2011-022311 A | 2/2011 |
| JP | 2014-149335 A | 8/2014 |
| JP | 2015-197577 A | 11/2015 |
| JP | 2018-100994 A | 6/2018 |
| KR | 10-2007-0082037 A | 8/2007 |
| TW | 200736693 A | 10/2007 |

\* cited by examiner

[ FIG. 1 ]
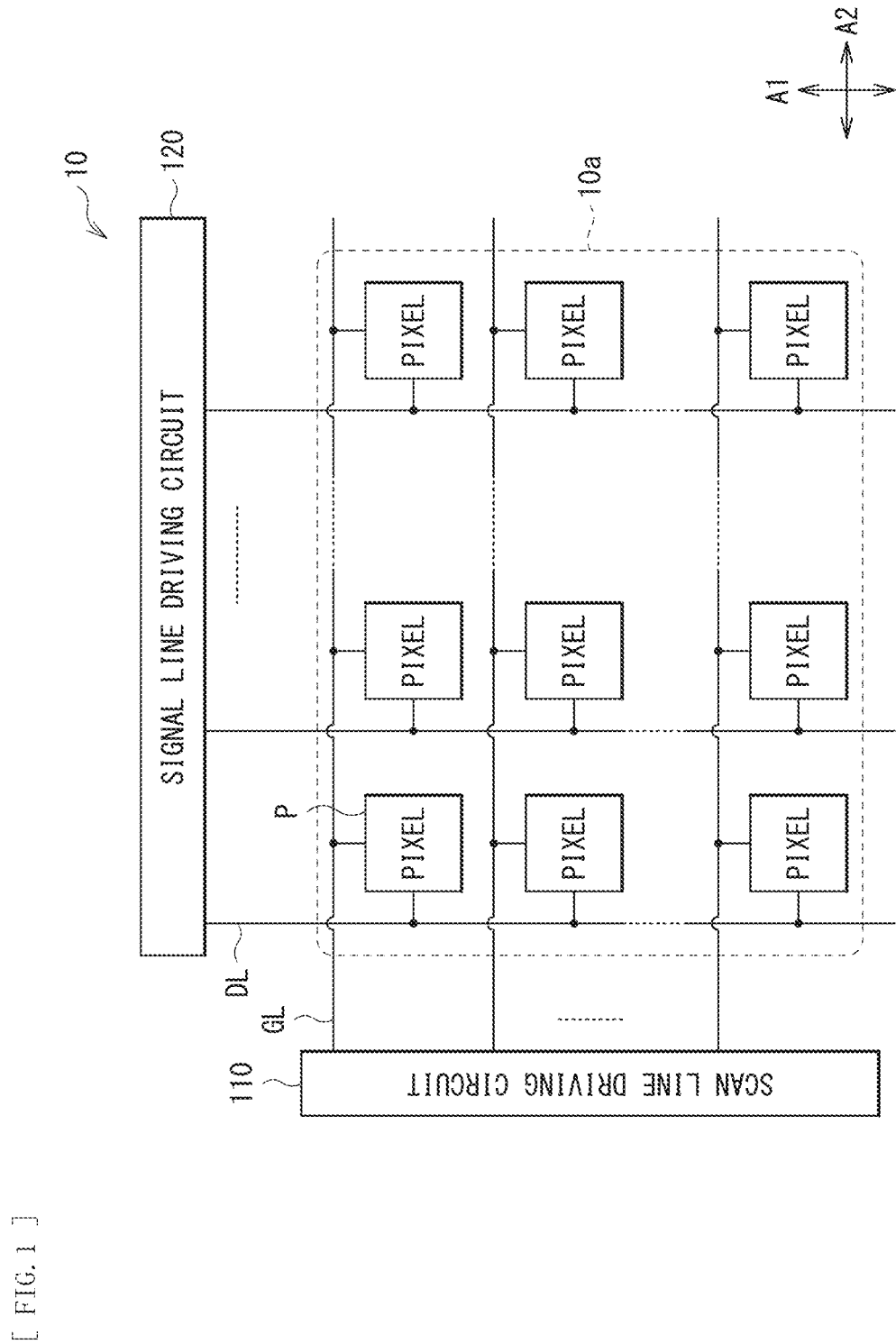

[FIG. 2]
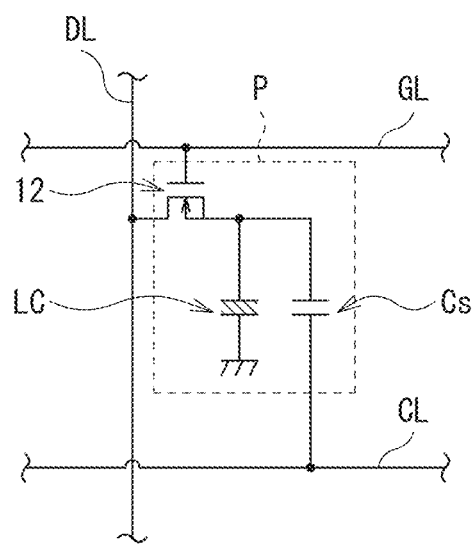

[FIG. 3]
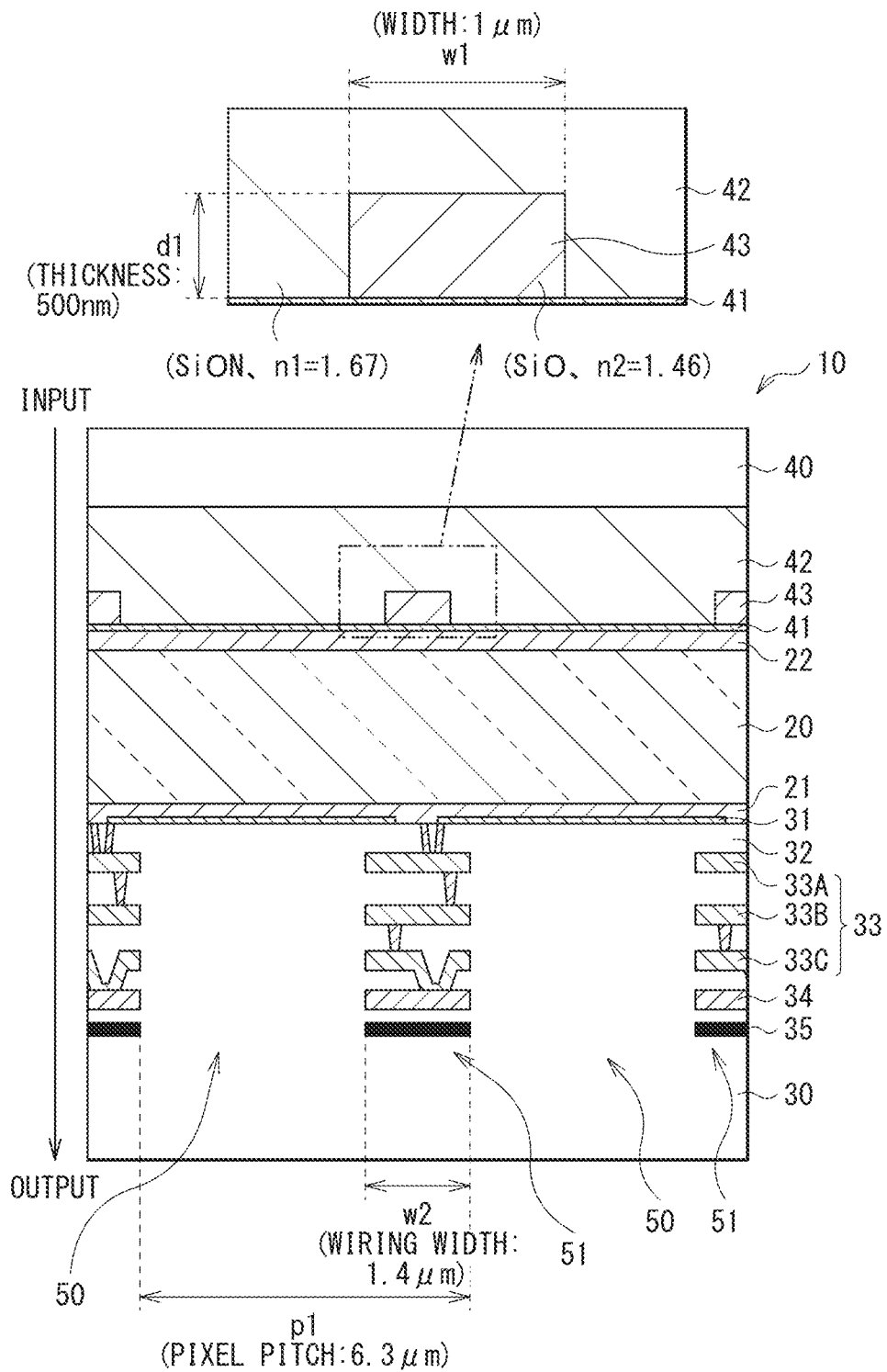

[FIG. 4]
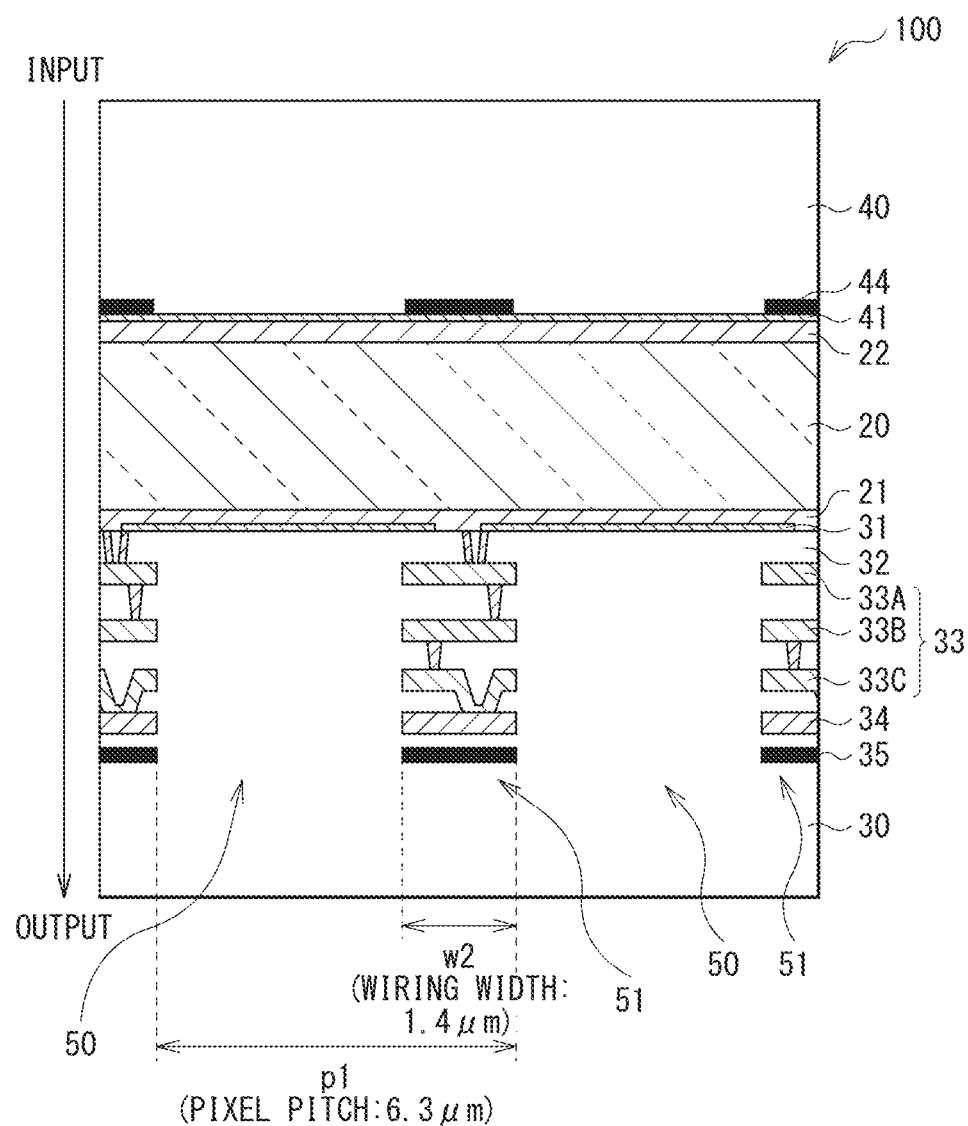

[FIG. 5]
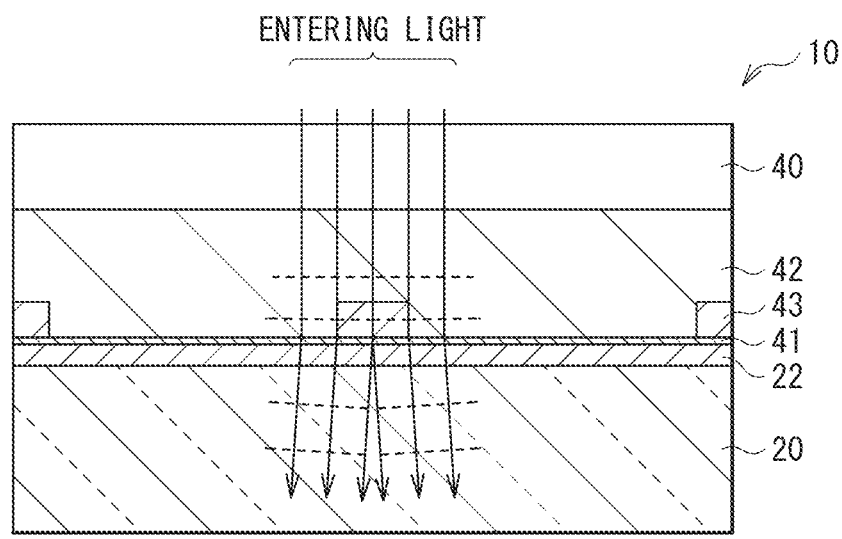
[FIG. 6]
COMPARATIVE EXAMPLE 1
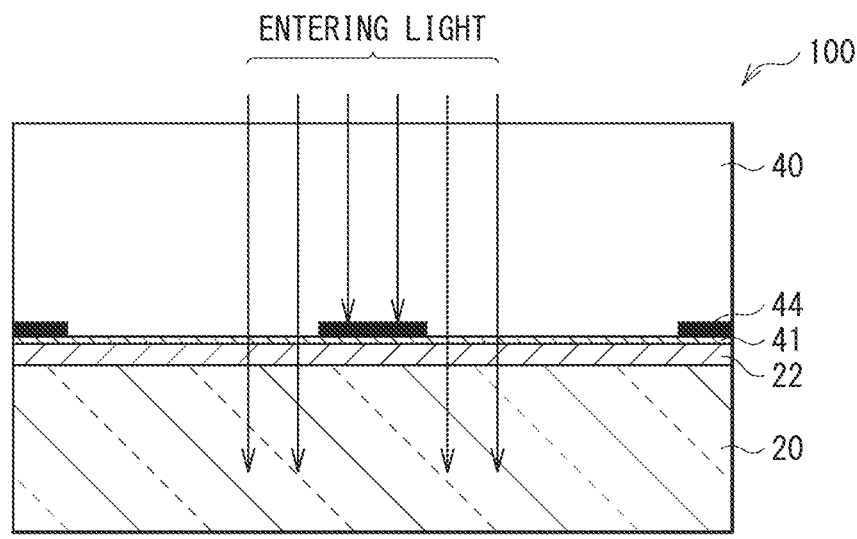

[FIG. 7]
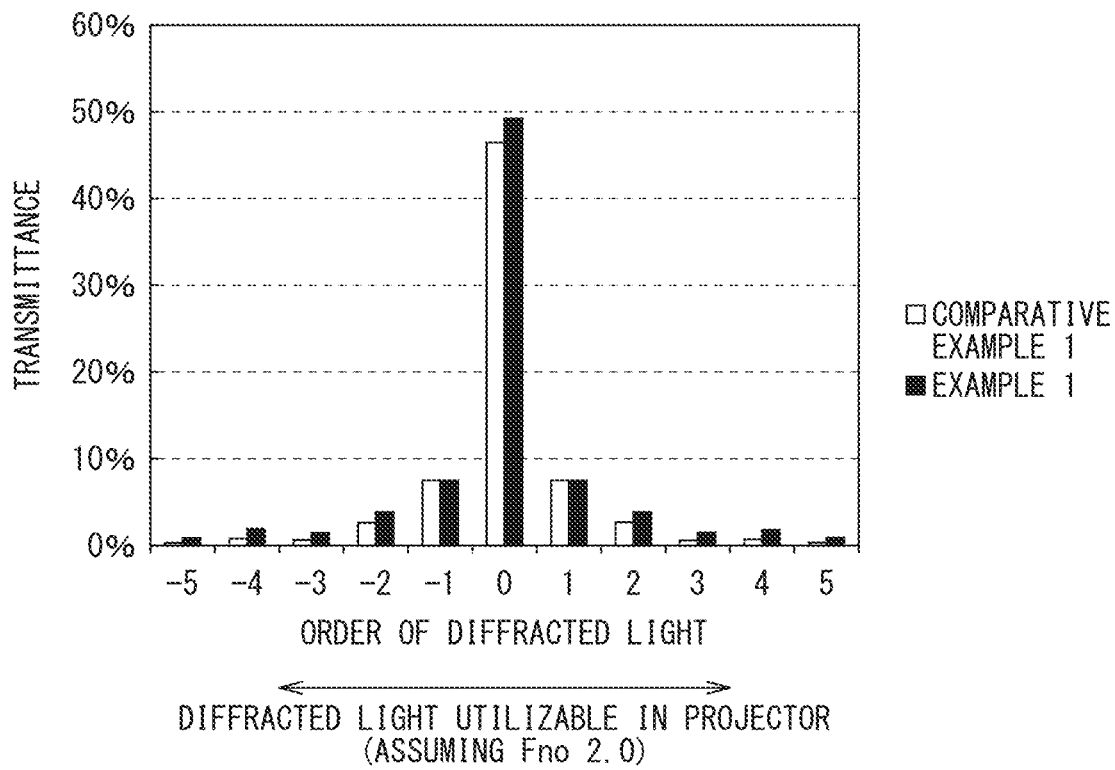

[FIG. 8]
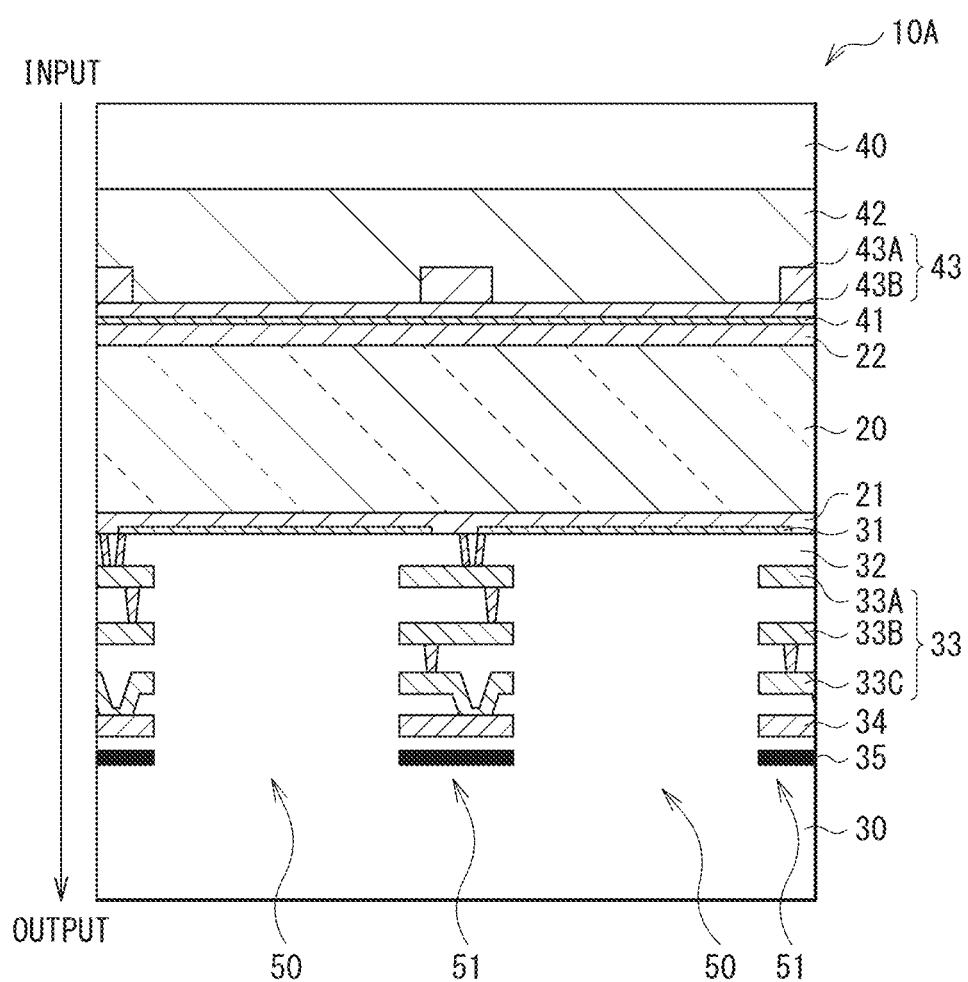

[FIG. 9]
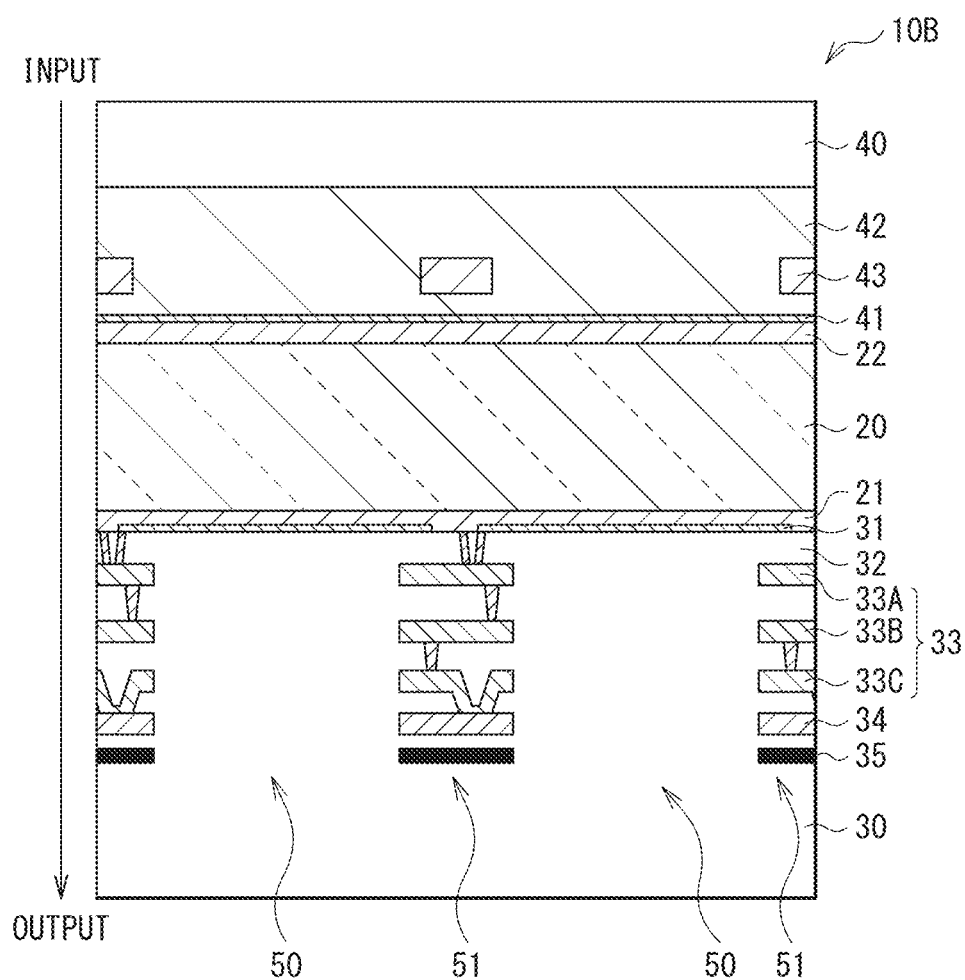

[FIG. 10]
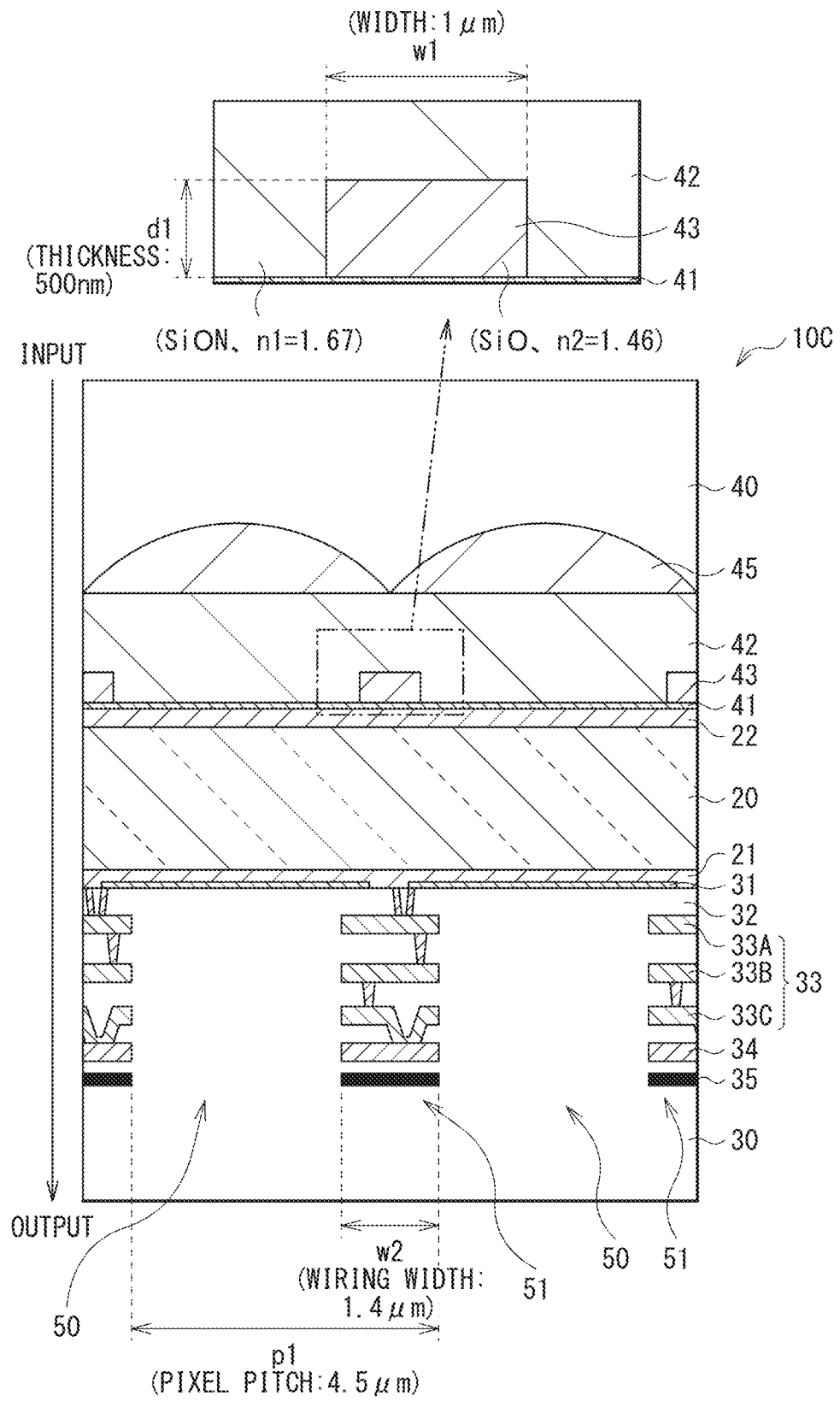

[ FIG. 11 ]
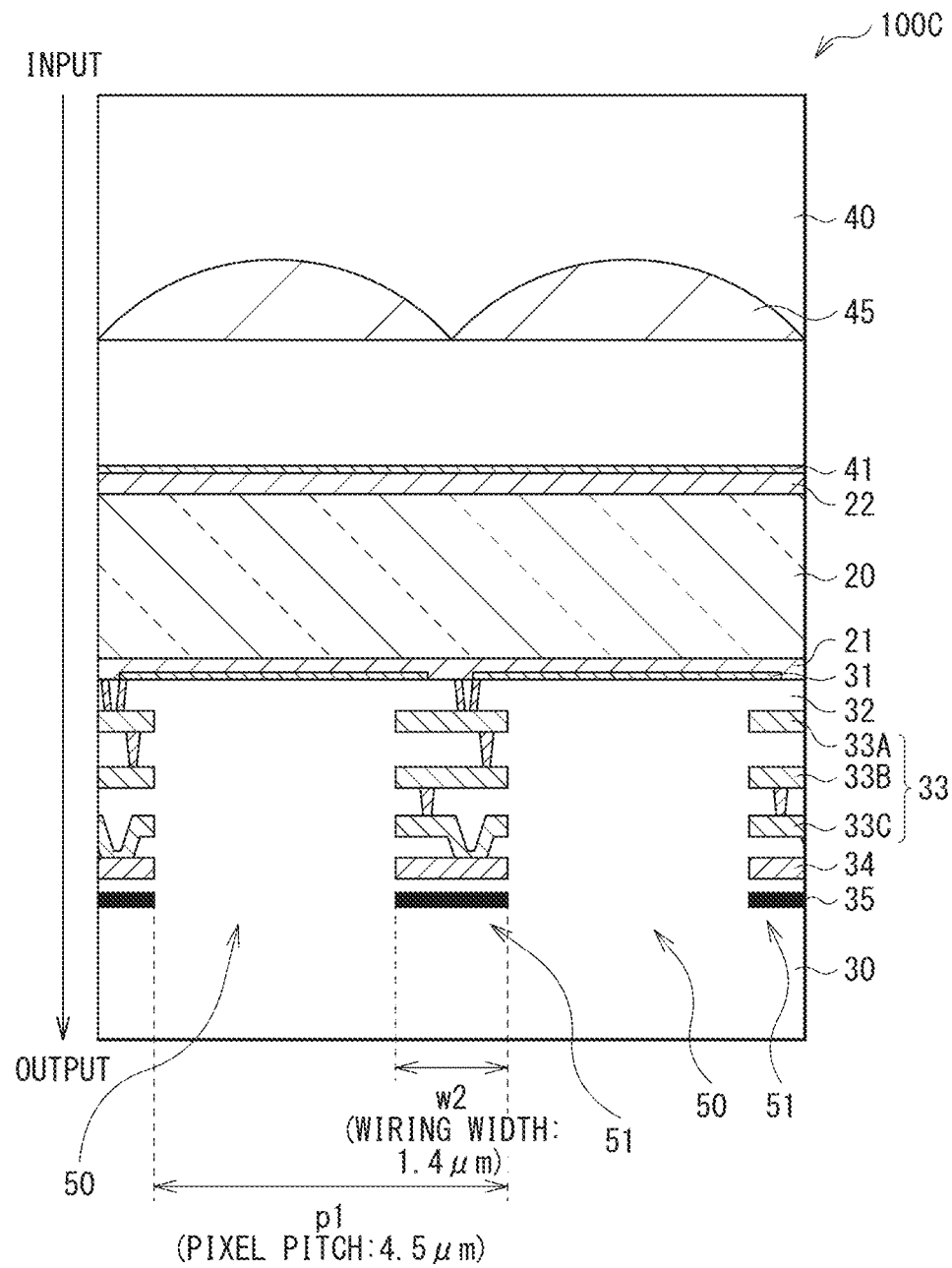

[ FIG. 12 ]
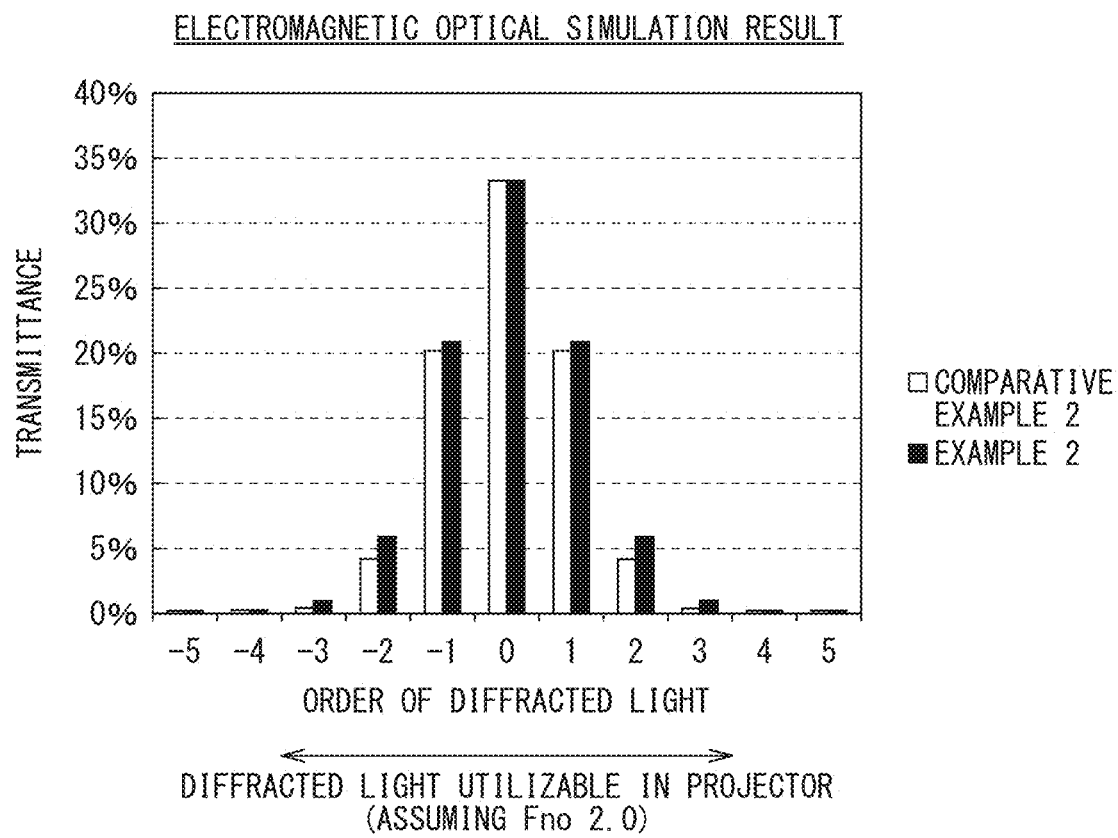

[FIG. 13]
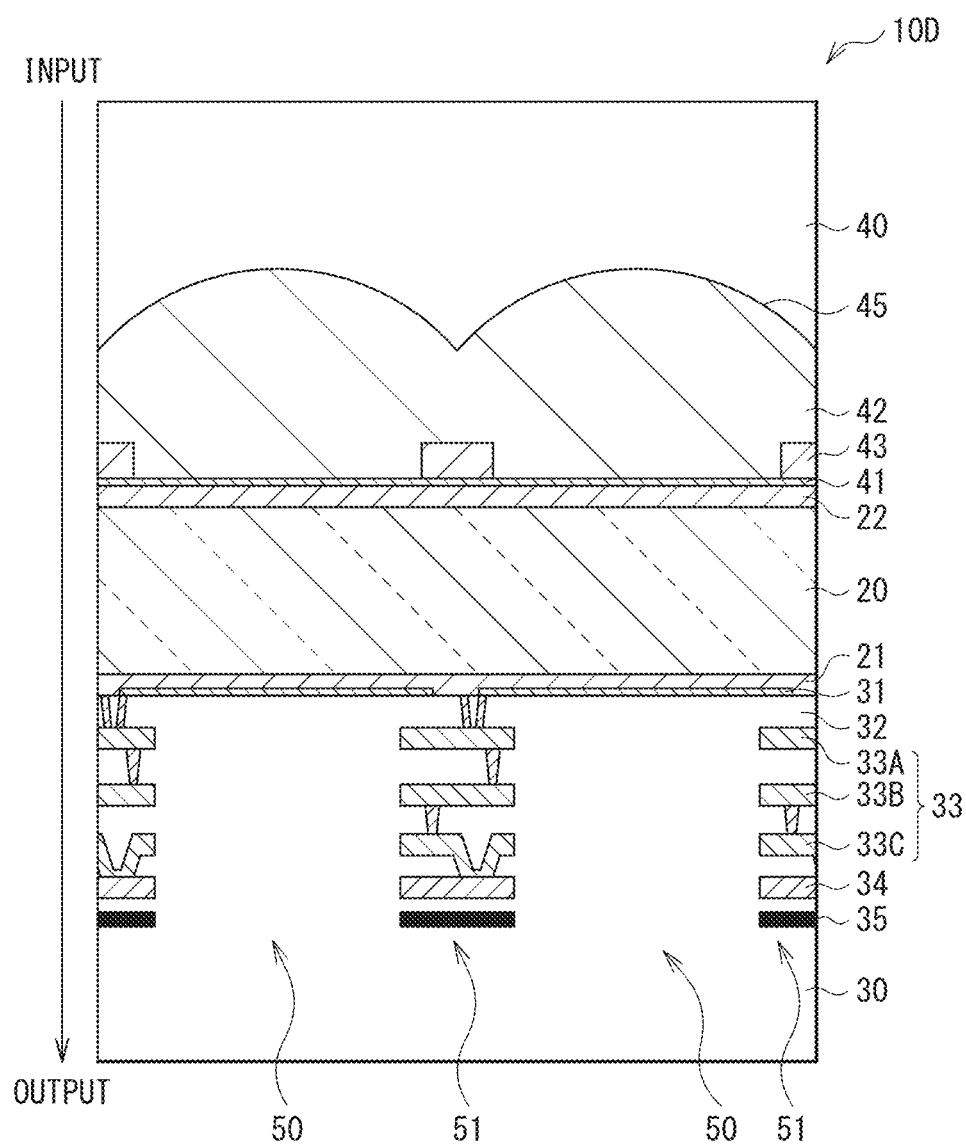

[FIG. 14]
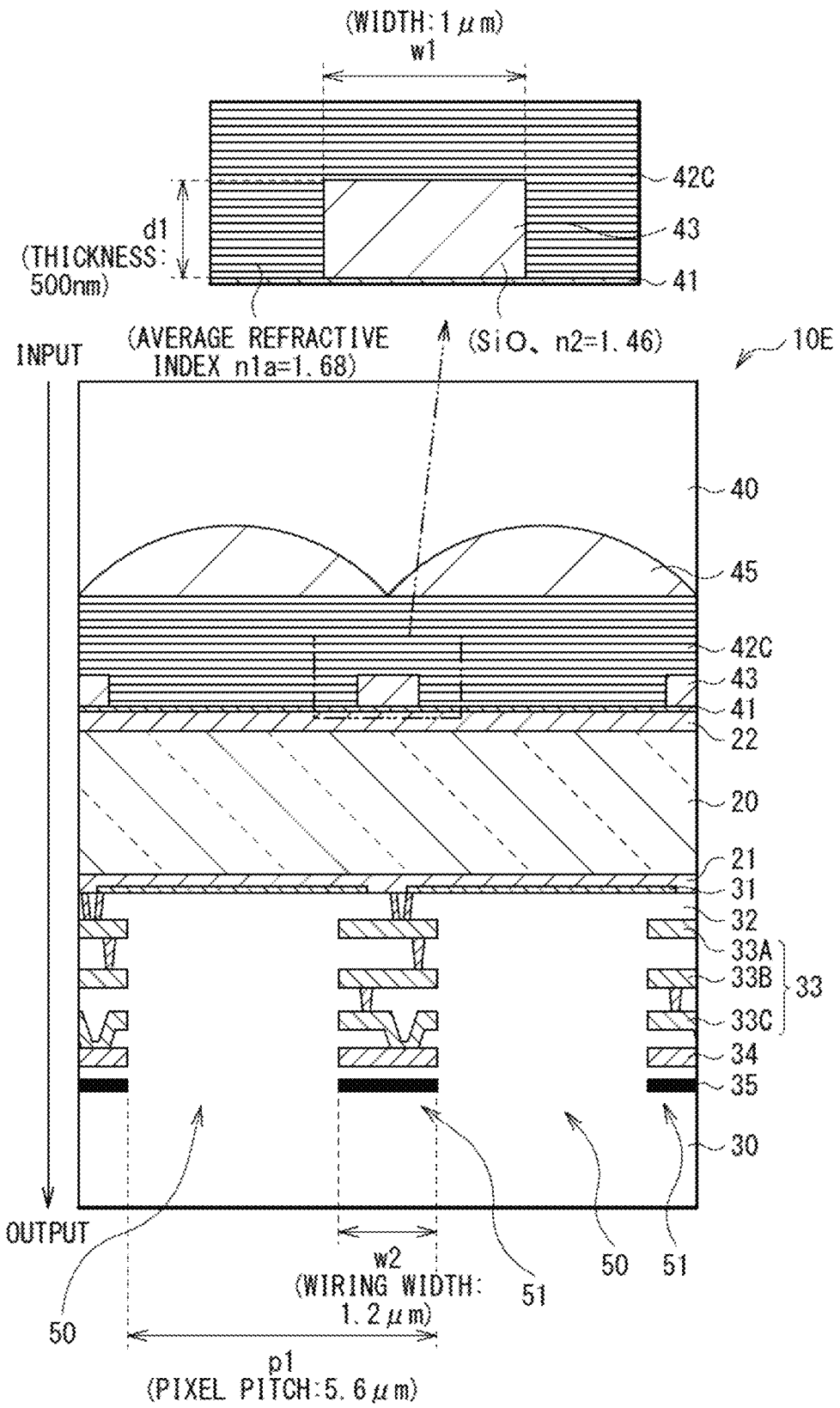

[FIG. 15]
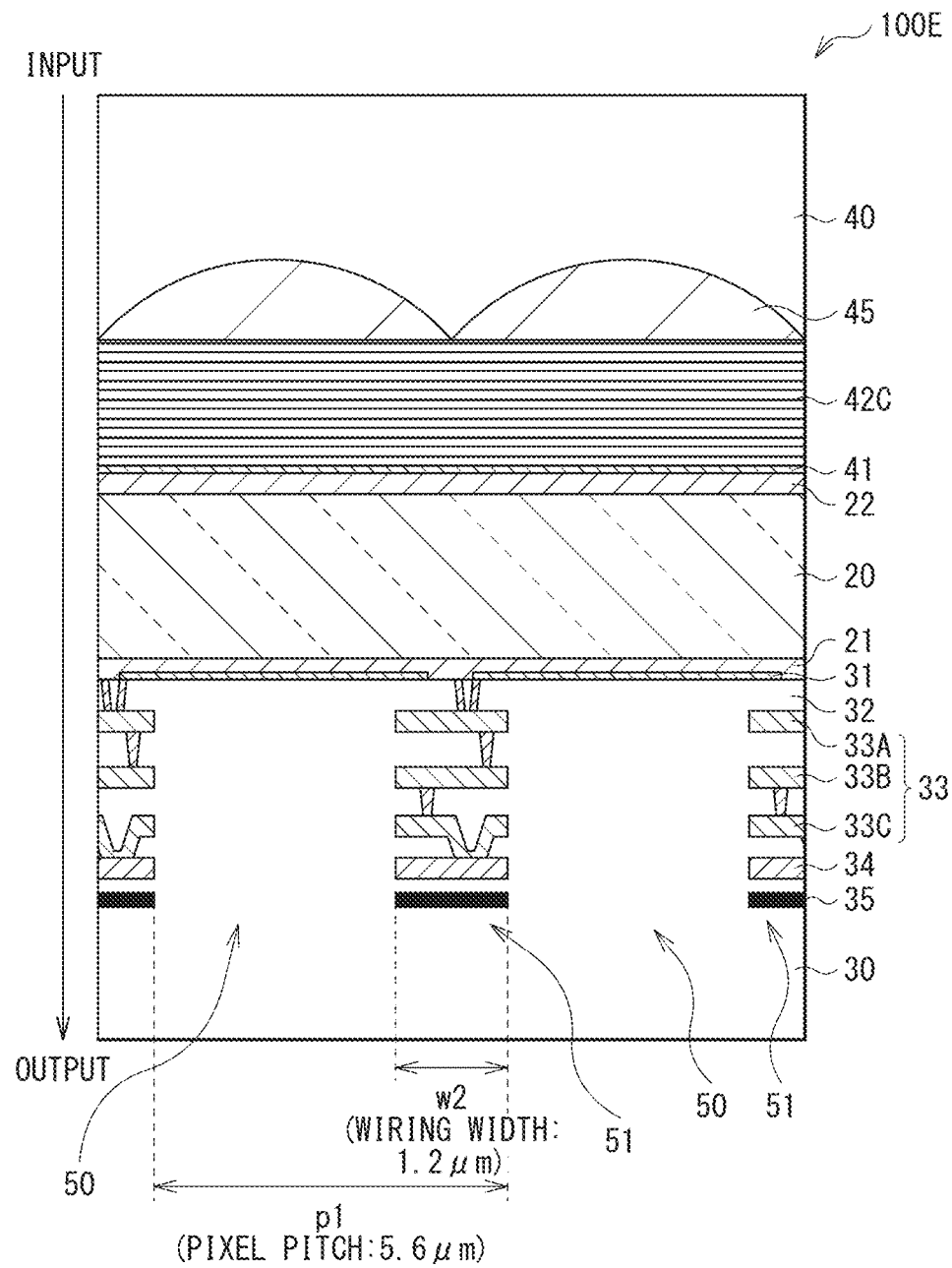

[ FIG. 16 ]
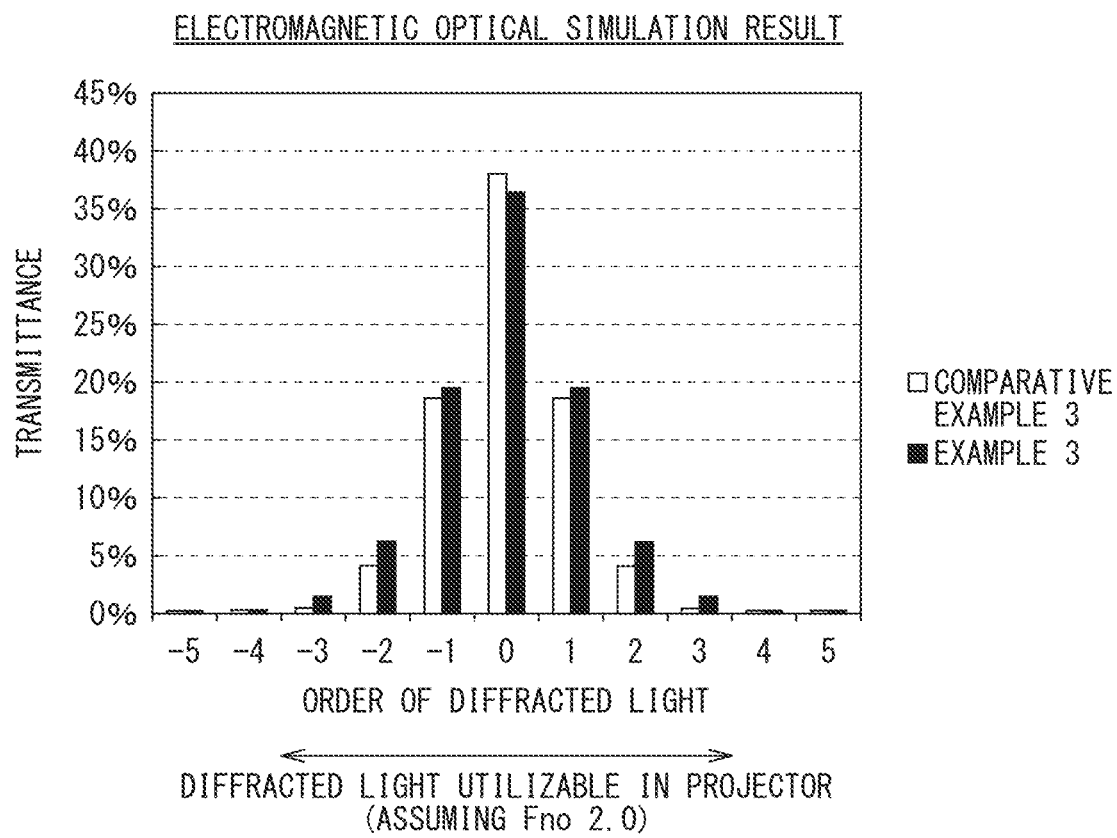

[FIG. 17]
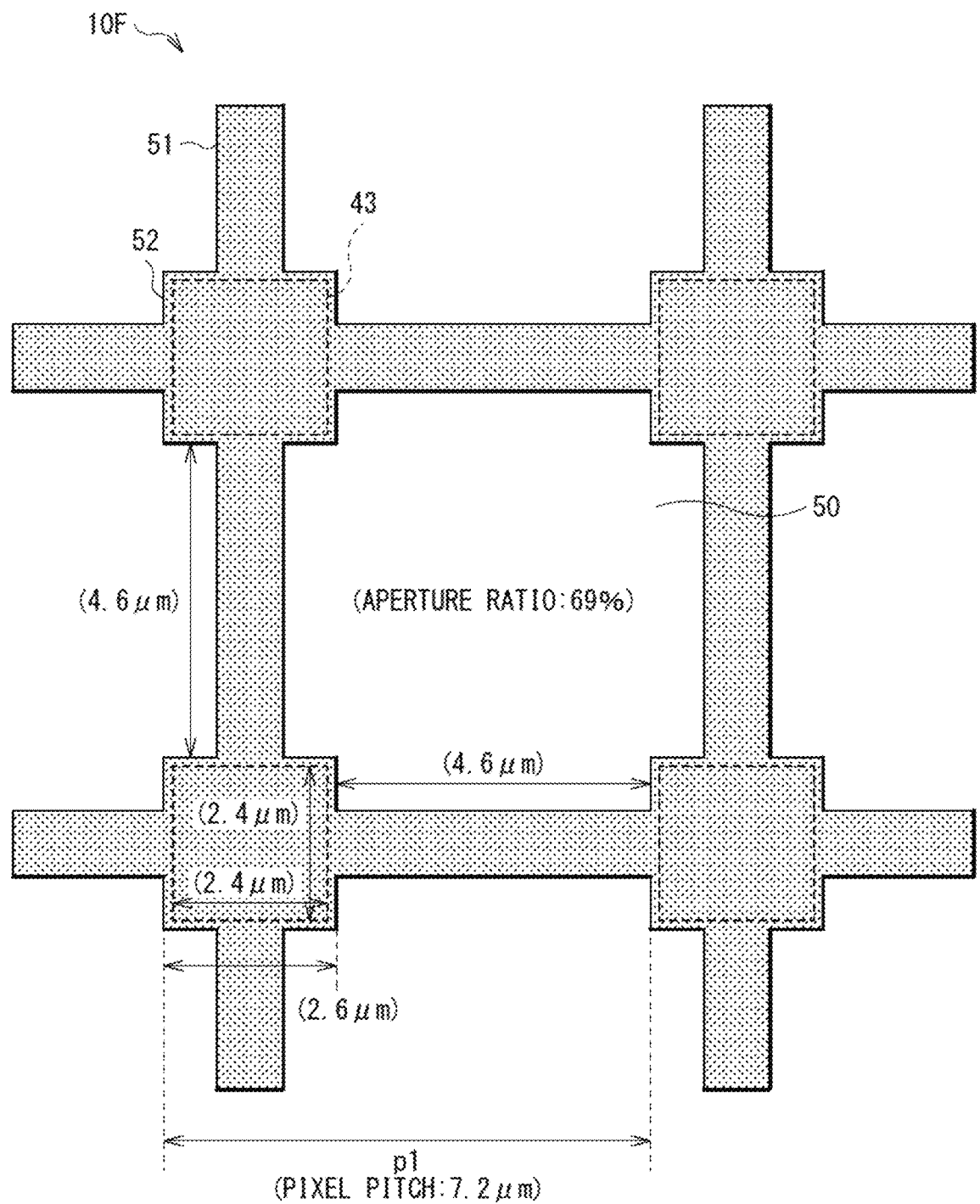

[ FIG. 18 ]
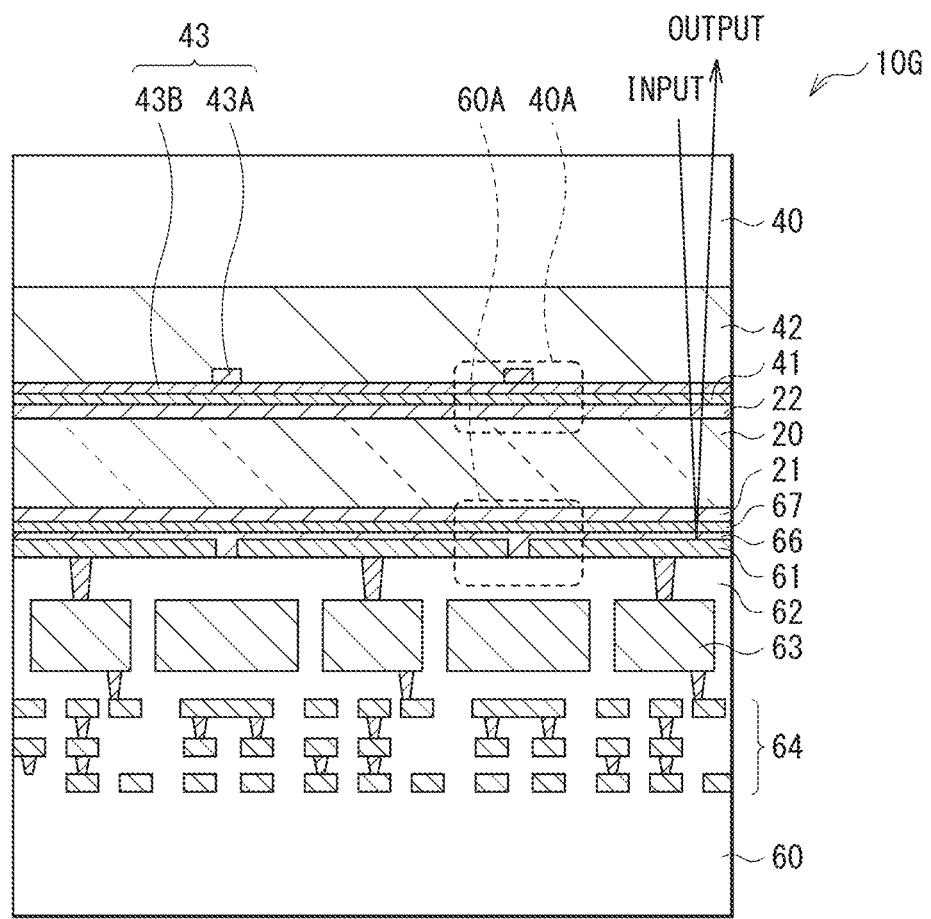

[ FIG. 19 ]
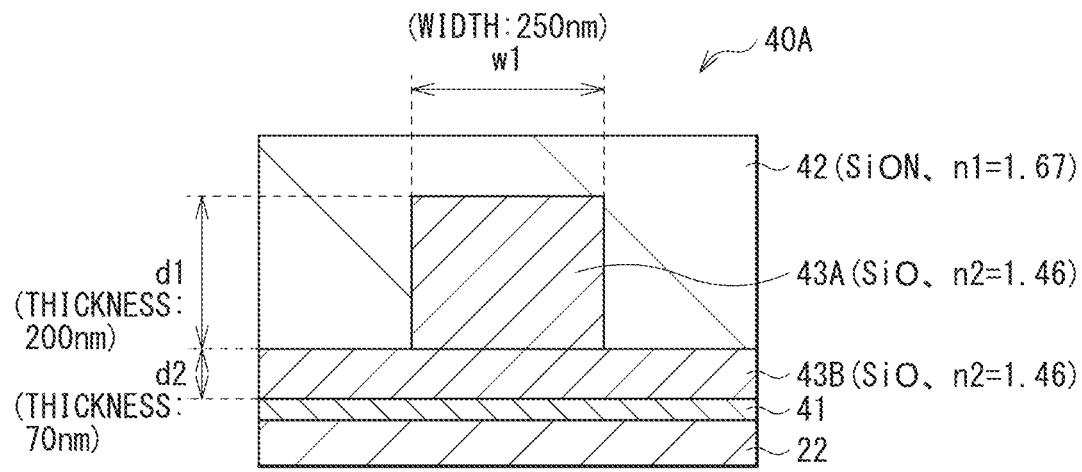
[ FIG. 20 ]
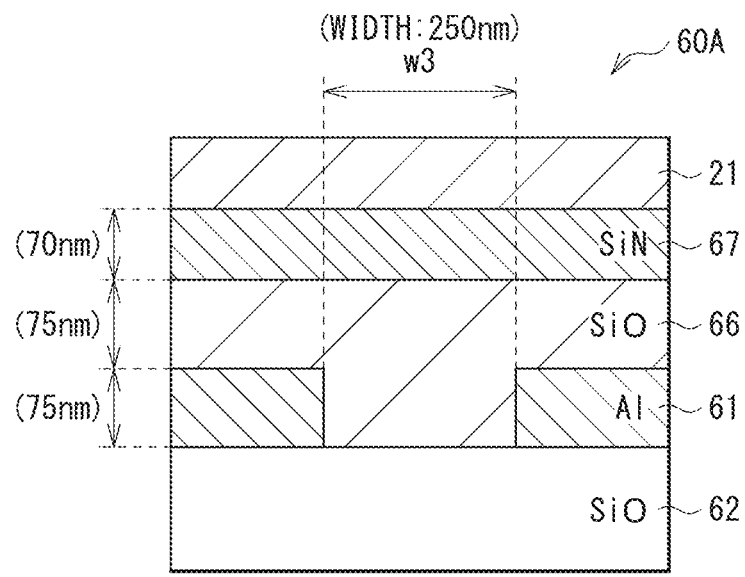

[ FIG. 21 ]
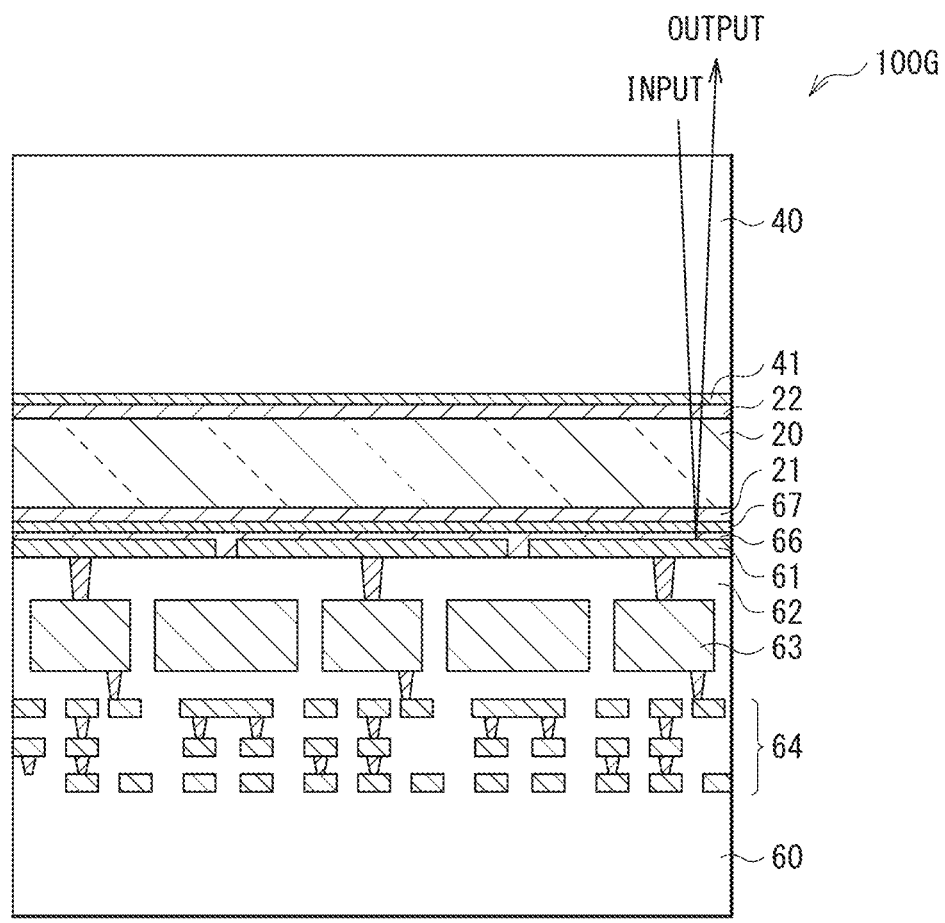

[FIG. 22]
COMPARATIVE EXAMPLE 6-1
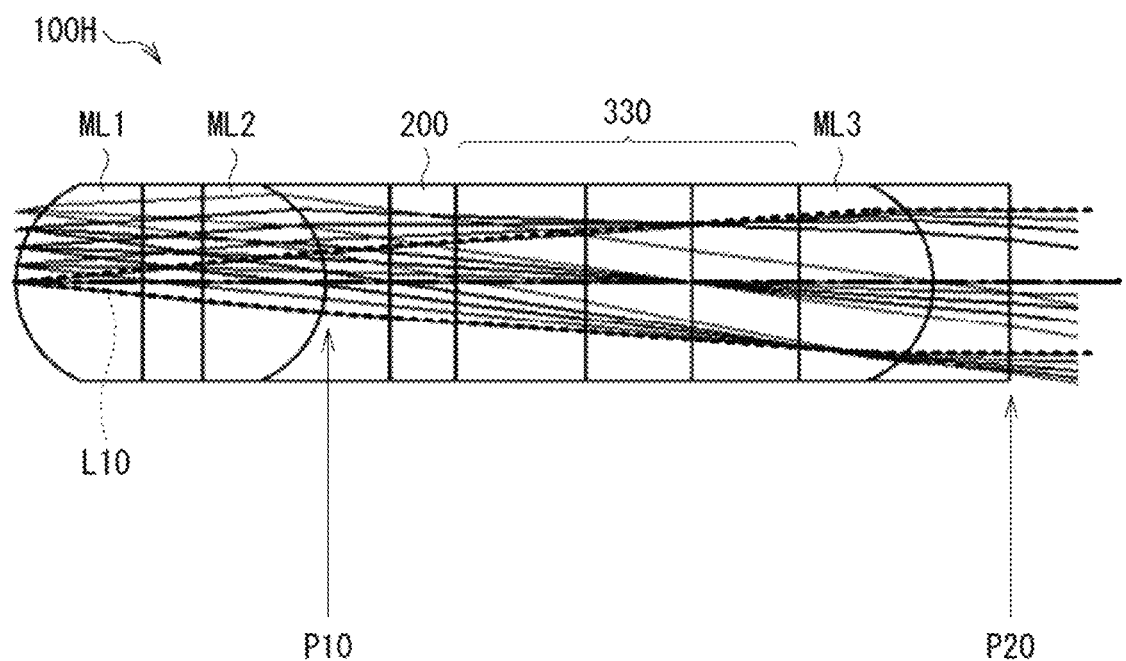
[FIG. 23]
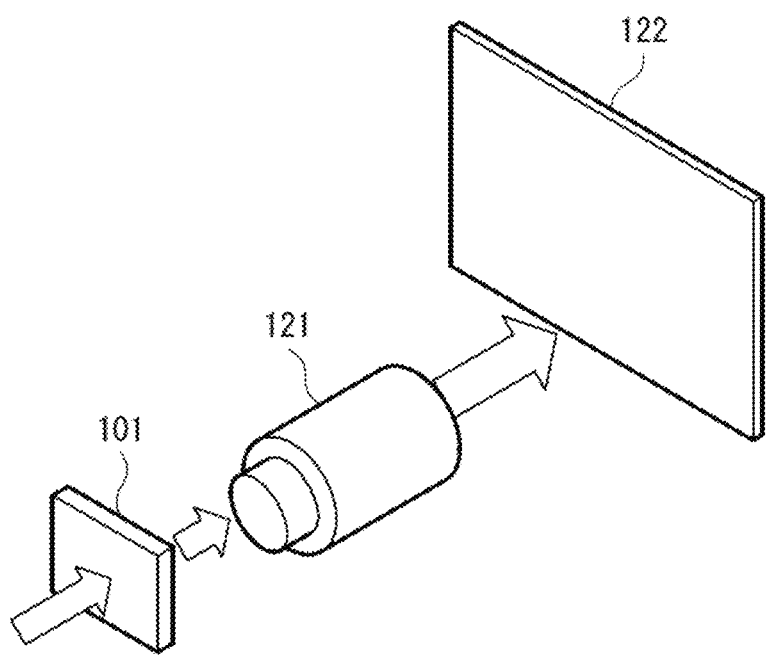

[FIG. 24]
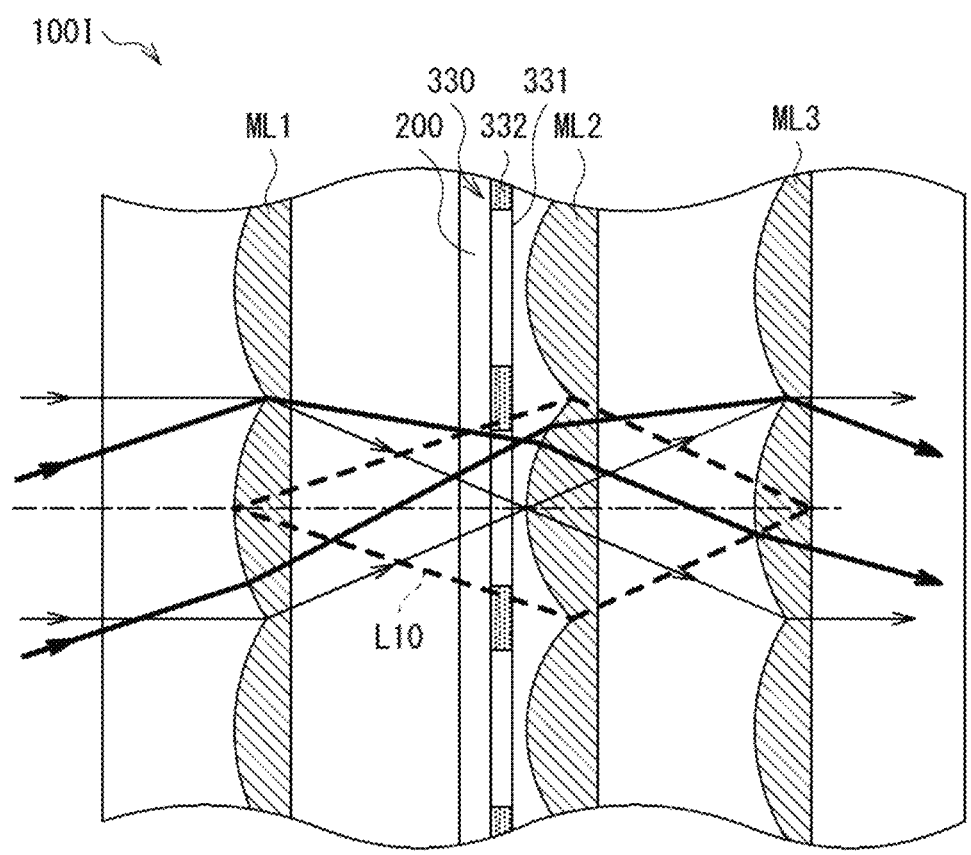

[FIG. 25]
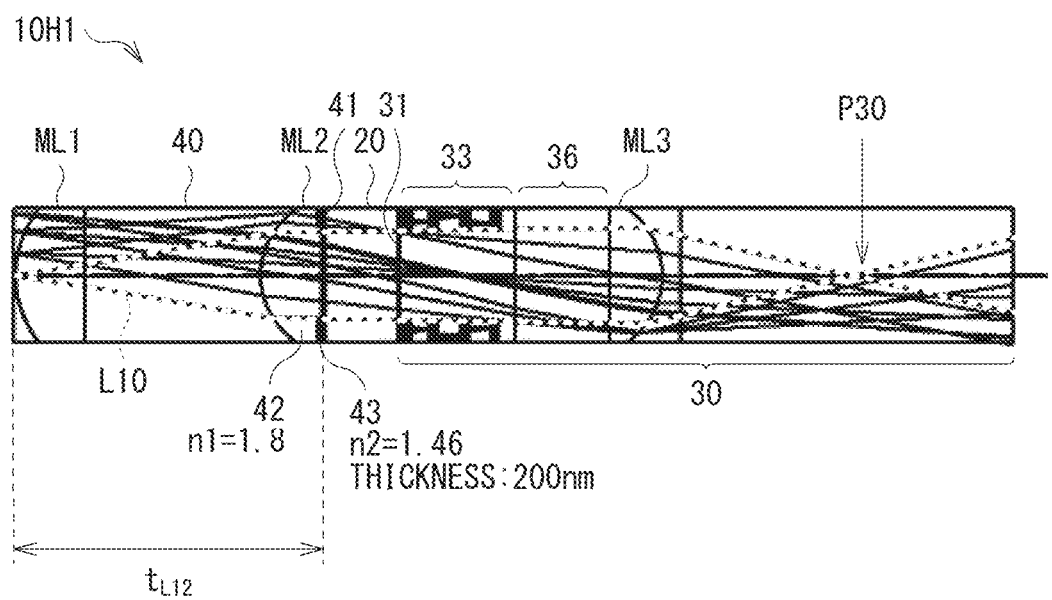

[FIG. 26]
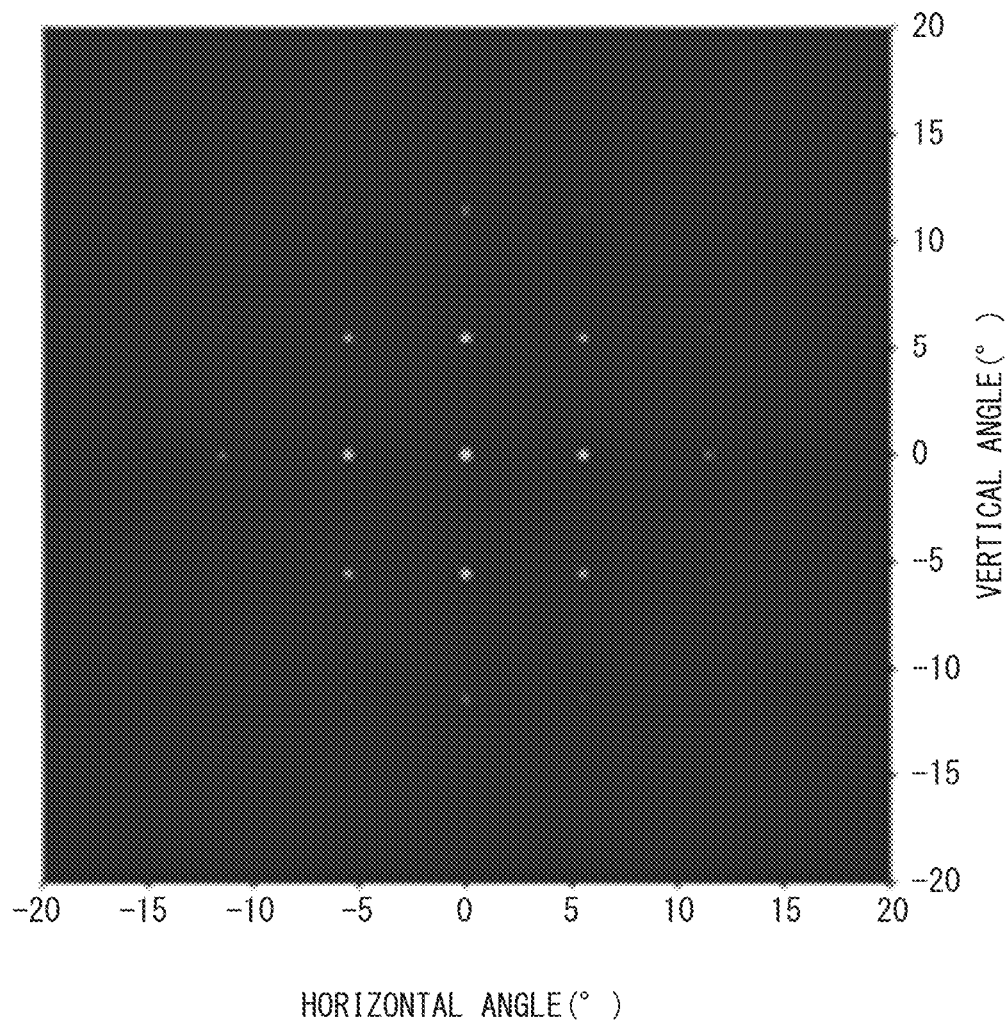

[FIG. 27]
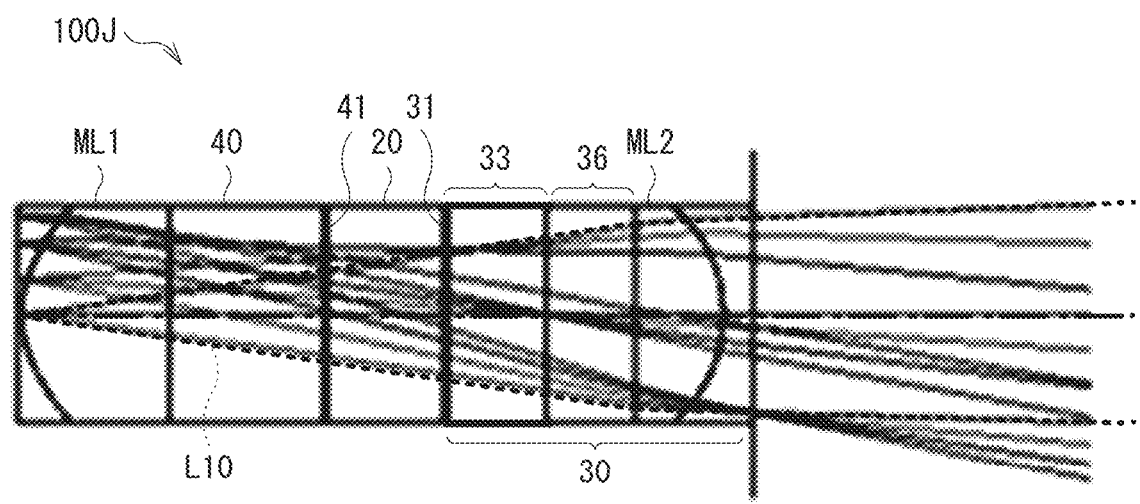

[FIG. 28]
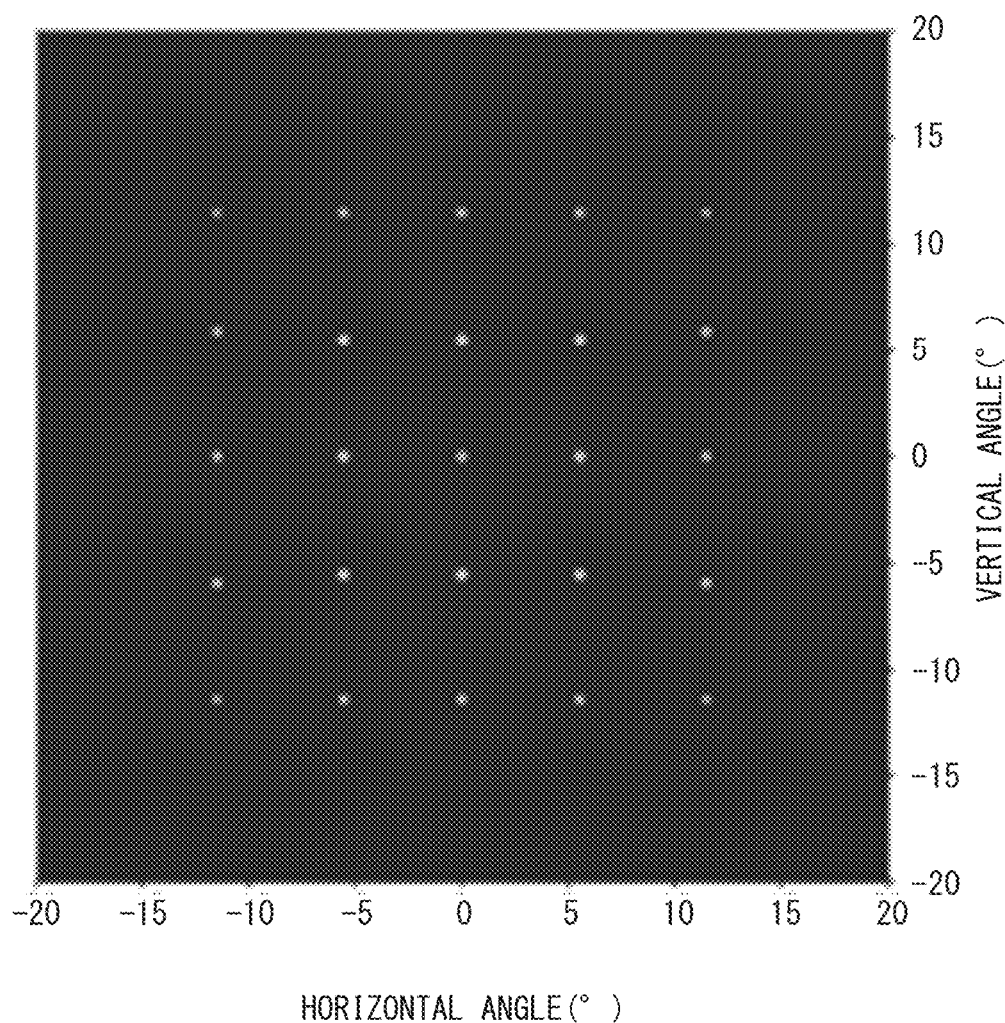

[ FIG. 29 ]
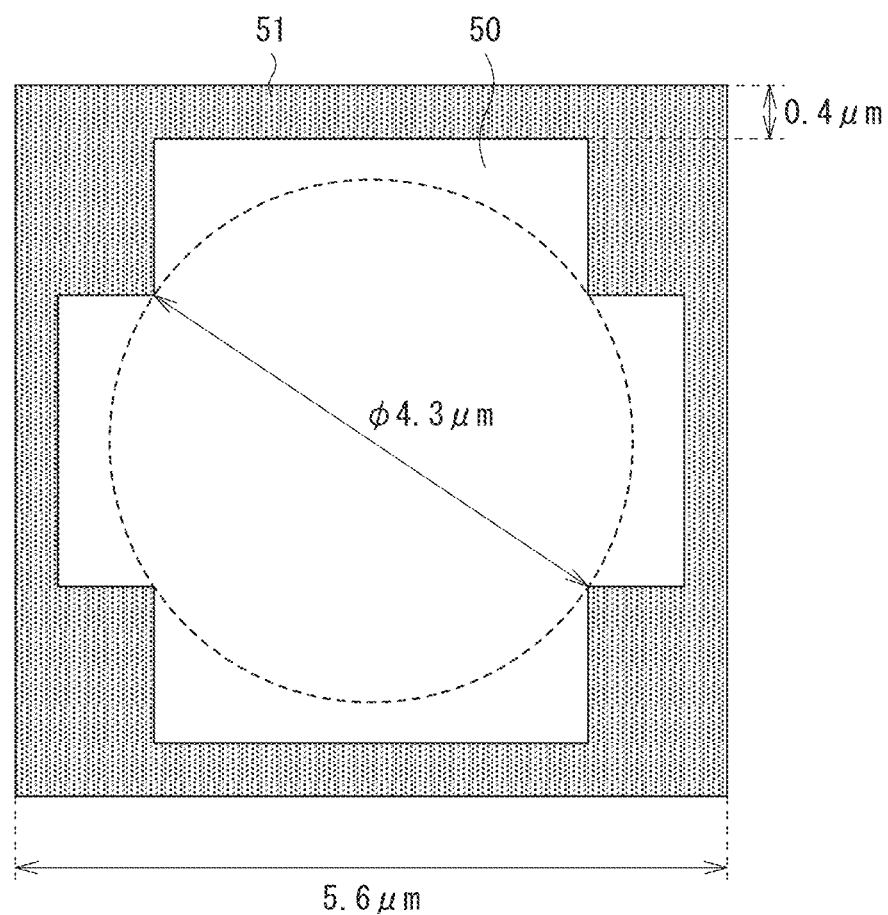

[FIG. 30]
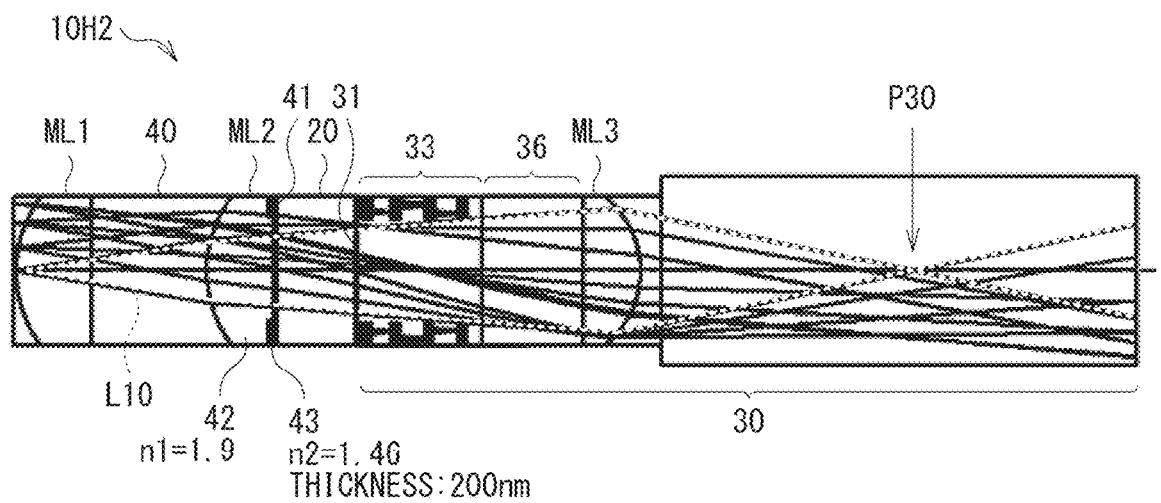
[FIG. 31]
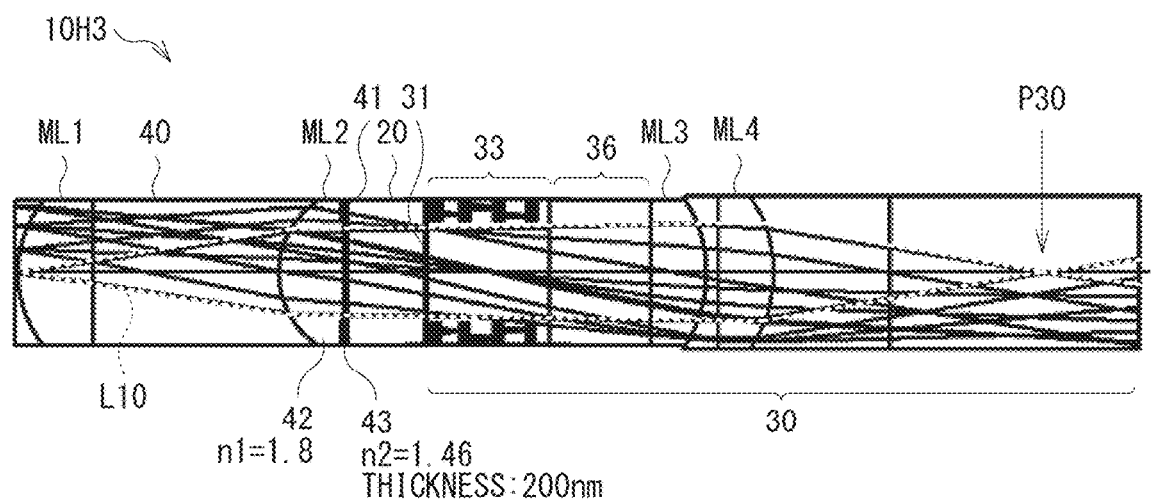

[ FIG. 32 ]
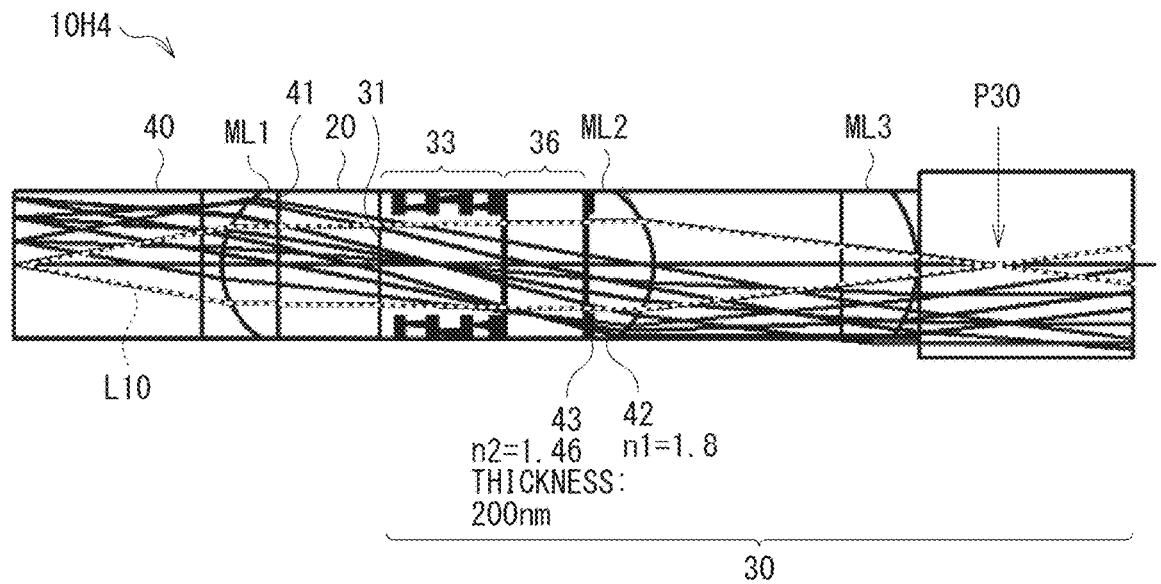
[ FIG. 33 ]
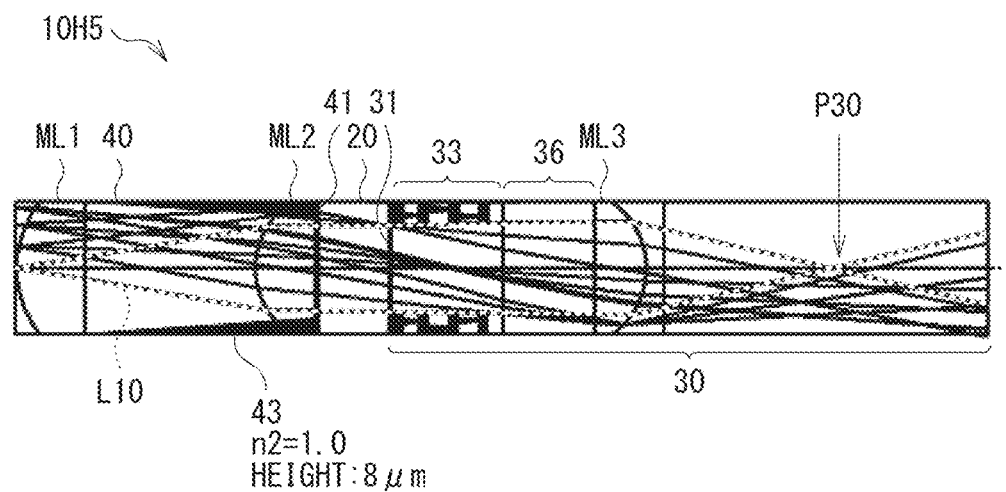

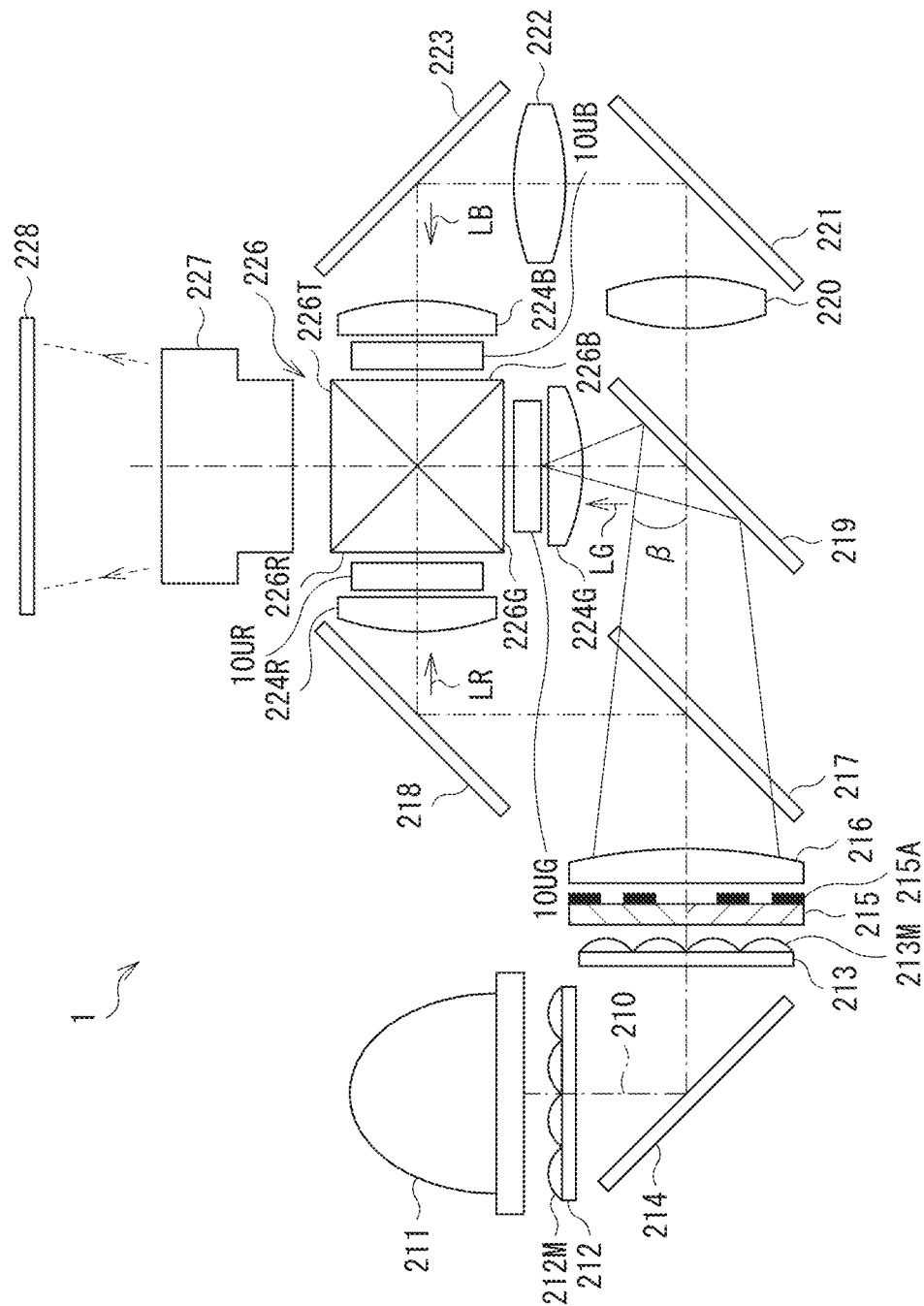
[FIG. 34]

[ FIG. 35 ]
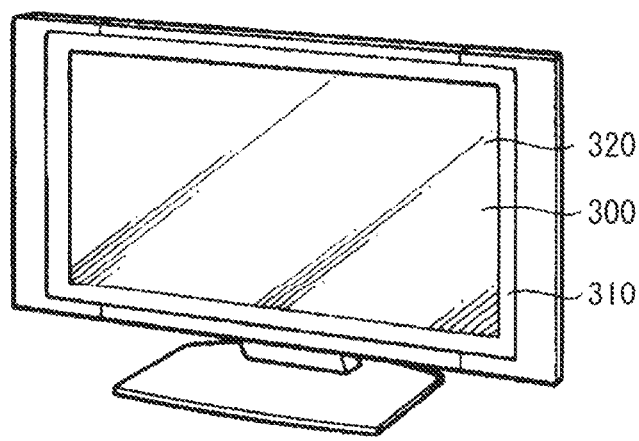
[ FIG. 36 ]
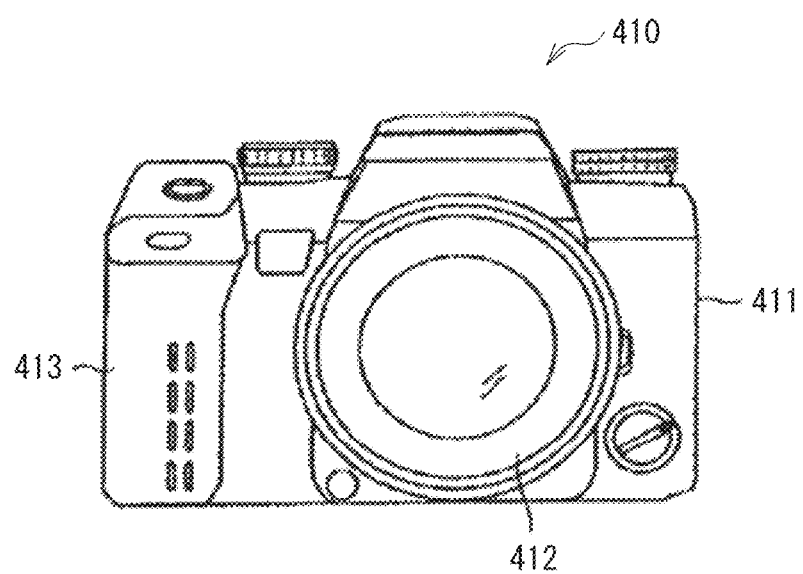

[ FIG. 37 ]
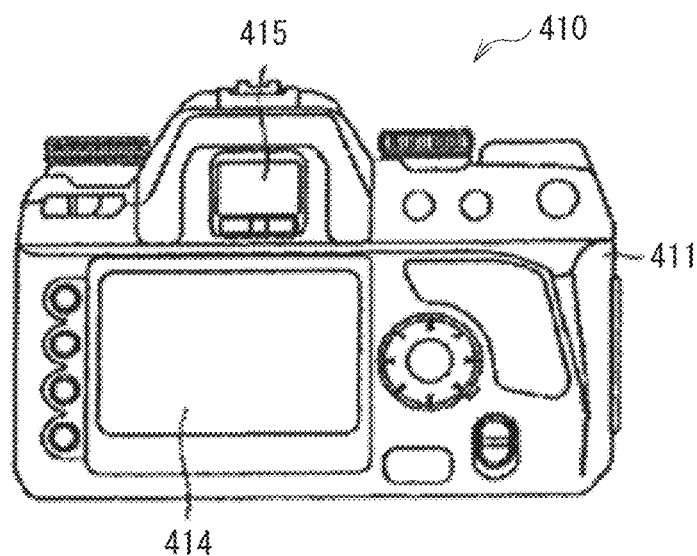
[ FIG. 38 ]
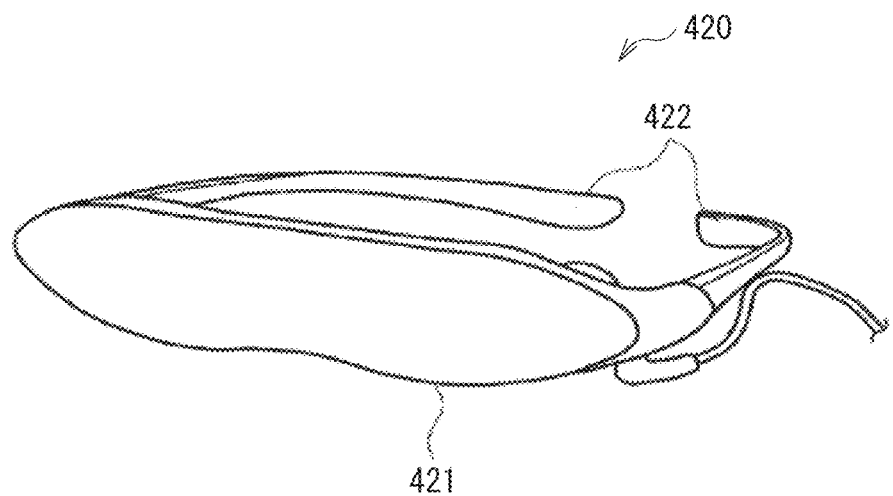

LIQUID CRYSTAL DISPLAY DEVICE AND ELECTRONIC APPARATUS

CROSS REFERENCE TO RELATED APPLICATIONS

This application is a U.S. National Phase of International Patent Application No. PCT/JP2020/025774 filed on Jul. 1, 2020, which claims priority benefit of Japanese Patent Application No. JP 2019-133827 filed in the Japan Patent Office on Jul. 19, 2019 and also claims priority benefit of Japanese Patent Application No. JP 2020-006346 filed in the Japan Patent Office on Jan. 17, 2020. Each of the above-referenced applications is hereby incorporated herein by reference in its entirety.

TECHNICAL FIELD

The present disclosure relates to a liquid crystal display device including a plurality of pixel electrodes, and to an electronic apparatus.

BACKGROUND ART

Techniques of improving transmittance of a transmissive liquid crystal display device to be used for a projector or the like include a method of increasing an aperture ratio by reducing a wiring width of a signal line, a gate line, etc. of a TFT (Thin Film Transistor) substrate or a size of a transistor. The techniques also include a method of increasing light utilization efficiency by bending light rays applied to a wiring line with a microlens provided for each pixel (e.g., see PTLs 1 to 5).

CITATION LIST

Patent Literature

PTL 1: Japanese Unexamined Patent Application Publication No. H10-133203
PTL 2: Japanese Unexamined Patent Application Publication No. H11-64836
PTL 3: Japanese Unexamined Patent Application Publication No. 2015-197577
PTL 4: Japanese Unexamined Patent Application Publication No. 2018-100994
PTL 5: Japanese Unexamined Patent Application Publication No. 2011-22311

SUMMARY OF THE INVENTION

It is desired to develop a technique that enables a further improvement in light utilization efficiency, as compared with the methods described above.

It is desirable to provide a liquid crystal display device and an electronic apparatus that make it possible to improve light utilization efficiency.

A first liquid crystal display device according to one embodiment of the present disclosure includes: a liquid crystal layer; a drive substrate including a light-shielding region and a transmissive region; a plurality of pixel electrodes that is transmissive and provided at a position corresponding to the transmissive region on the drive substrate; a counter substrate disposed to be opposed to the drive substrate with the plurality of pixel electrodes and the liquid crystal layer interposed therebetween; a first layer provided between the counter substrate and the liquid crystal layer and including a material having a first refractive index; and a second layer that is provided in at least a portion of a region corresponding to the light-shielding region in the first layer, includes a material having a second refractive index lower than the first refractive index, and has a rectangular cross-sectional shape in a thickness direction.

A second liquid crystal display device according to one embodiment of the present disclosure includes: a liquid crystal layer; a drive substrate; a plurality of pixel electrodes that is reflective and provided on the drive substrate; a counter substrate disposed to be opposed to the drive substrate with the plurality of pixel electrodes and the liquid crystal layer interposed therebetween; a first layer provided between the counter substrate and the liquid crystal layer and including a material having a first refractive index; and a second layer that is provided in at least a portion of a region, in the first layer, corresponding to a location between the plurality of pixel electrodes, includes a material having a second refractive index lower than the first refractive index, and has a rectangular cross-sectional shape in a thickness direction.

A first electronic apparatus according to one embodiment of the present disclosure includes the first liquid crystal display device according to one embodiment of the present disclosure described above.

A second electronic apparatus according to one embodiment of the present disclosure includes the second liquid crystal display device according to one embodiment of the present disclosure described above.

In the first or second liquid crystal display device or the first or second electronic apparatus according to one embodiment of the present disclosure, for an improvement in light utilization efficiency, the first layer and the second layer with the optimized refractive indices and shapes are provided between the counter substrate and the liquid crystal layer.

BRIEF DESCRIPTION OF DRAWINGS

FIG. 1 is a configuration diagram schematically illustrating an example of a circuit configuration of a liquid crystal display device according to a first embodiment of the present disclosure.

FIG. 2 is a circuit diagram schematically illustrating an example of a circuit configuration of one pixel in the liquid crystal display device according to the first embodiment.

FIG. 3 is a schematic cross-sectional view of a configuration example of the liquid crystal display device according to the first embodiment.

FIG. 4 is a schematic cross-sectional view of a configuration example of a liquid crystal display device according to Comparative Example 1.

FIG. 5 is an explanatory diagram illustrating an example of an action of the liquid crystal display device according to the first embodiment on entering light.

FIG. 6 is an explanatory diagram illustrating an example of an action of the liquid crystal display device according to Comparative Example 1 on entering light.

FIG. 7 is an explanatory diagram illustrating an example of a result of simulating, in terms of electromagnetic optics, light utilization efficiency of each of a liquid crystal display device according to Example 1 and the liquid crystal display device according to Comparative Example 1.

FIG. 8 is a schematic cross-sectional view of a configuration example of a liquid crystal display device according to Modification Example 1 of the first embodiment.

FIG. 9 is a schematic cross-sectional view of a configuration example of a liquid crystal display device according to Modification Example 2 of the first embodiment.

FIG. 10 is a schematic cross-sectional view of a configuration example of a liquid crystal display device according to a second embodiment.

FIG. 11 is a schematic cross-sectional view of a configuration example of a liquid crystal display device according to Comparative Example 2.

FIG. 12 is an explanatory diagram illustrating an example of a result of simulating, in terms of electromagnetic optics, light utilization efficiency of each of a liquid crystal display device according to Example 2 and the liquid crystal display device according to Comparative Example 2.

FIG. 13 is a schematic cross-sectional view of a configuration example of a liquid crystal display device according to Modification Example 1 of the second embodiment.

FIG. 14 is a schematic cross-sectional view of a configuration example of a liquid crystal display device according to a third embodiment.

FIG. 15 is a schematic cross-sectional view of a configuration example of a liquid crystal display device according to Comparative Example 3.

FIG. 16 is an explanatory diagram illustrating an example of a result of simulating, in terms of electromagnetic optics, light utilization efficiency of each of a liquid crystal display device according to Example 3 and the liquid crystal display device according to Comparative Example 3.

FIG. 17 is a schematic plan view of a configuration example of a main part of a liquid crystal display device according to a fourth embodiment.

FIG. 18 is a schematic cross-sectional view of a configuration example of a liquid crystal display device according to a fifth embodiment.

FIG. 19 is an enlarged cross-sectional view of a configuration around a low refractive index region of a counter substrate in the liquid crystal display device illustrated in FIG. 18.

FIG. 20 is an enlarged cross-sectional view of a configuration around an inter-pixel region of a drive substrate in the liquid crystal display device illustrated in FIG. 18.

FIG. 21 is a schematic cross-sectional view of a configuration example of a liquid crystal display device according to Comparative Example 4.

FIG. 22 is a schematic cross-sectional view of a main part of a liquid crystal display device according to Comparative Example 6-1.

FIG. 23 is a configuration diagram briefly illustrating a configuration example of a typical transmissive projector.

FIG. 24 is a schematic cross-sectional view of a configuration example of a liquid crystal display device according to Comparative Example 6-2.

FIG. 25 is a schematic cross-sectional view of a main part of a liquid crystal display device according to Example 6-1.

FIG. 26 is an explanatory diagram illustrating an example of a state of an output diffraction angle in the liquid crystal display device according to Example 6-1.

FIG. 27 is a schematic cross-sectional view of a main part of a liquid crystal display device according to Comparative Example 6-3.

FIG. 28 is an explanatory diagram illustrating an example of a state of an output diffraction angle in the liquid crystal display device according to Comparative Example 6-3.

FIG. 29 is a plan view of an example of an opening and a light-shielding region of a wiring layer 33 in the liquid crystal display device according to Example 6-1.

FIG. 30 is a schematic cross-sectional view of a main part of a liquid crystal display device according to Example 6-2.

FIG. 31 is a schematic cross-sectional view of a main part of a liquid crystal display device according to Example 6-3.

FIG. 32 is a schematic cross-sectional view of a main part of a liquid crystal display device according to Example 6-4.

FIG. 33 is a schematic cross-sectional view of a main part of a liquid crystal display device according to Example 6-5.

FIG. 34 is a configuration diagram schematically illustrating an example of a projection display serving as an electronic apparatus according to an application example.

FIG. 35 is a schematic appearance view of a configuration example of a television apparatus serving as an electronic apparatus according to an application example.

FIG. 36 is a schematic front view of a configuration example of a digital single-lens reflex camera serving as an electronic apparatus according to the application example.

FIG. 37 is a schematic rear view of the configuration example of the digital single-lens reflex camera serving as the electronic apparatus according to the application example.

FIG. 38 is a schematic perspective view of a configuration example of a head-mounted display serving as an electronic apparatus according to the application example.

MODES FOR CARRYING OUT THE INVENTION

In the following, description is given of embodiments of the present disclosure in detail with reference to the drawings. It is to be noted that the description is given in the following order.
  0. Comparative Examples
  1. First Embodiment (transmissive liquid crystal display device) (FIG. 1 to FIG. 9)
    1.1 Circuit Configuration of Liquid Crystal Display Device
    1.2 Cross-Sectional Configuration and Action of Liquid Crystal Display Device
    1.3 Example (simulation of light utilization efficiency)
    1.4 Effects
    1.5 Modification Examples
  2. Second Embodiment (configuration example including microlens on counter substrate) (FIG. 10 to FIG. 13)
    2.1 Configuration
    2.2 Example (simulation of light utilization efficiency)
    2.3 Effects
    2.4 Modification Example
  3. Third Embodiment (configuration example including C-plate on counter substrate) (FIG. 14 to FIG. 16)
    3.1 Configuration
    3.2 Example (simulation of light utilization efficiency)
    3.3 Effects
  4. Fourth Embodiment (configuration example in which rectangular low refractive index layer is provided in only region corresponding to pixel corner) (FIG. 17)
    4.1 Configuration
    4.2 Effects
  5. Fifth Embodiment (reflective liquid crystal display device) (FIG. 18 to FIG. 21)
  6. Sixth Embodiment (configuration example in which microlens is provided on both of counter substrate side and drive substrate side) (FIG. 22 to FIG. 33)
    6.1 Overview
    6.2 Examples
    6.3 Modification Examples 7. Application Examples (FIG. 34 to FIG. 38)
8. Other Embodiments

0. COMPARATIVE EXAMPLES

As a technique similar to an improvement in light utilization efficiency of a liquid crystal display device with the use of a microlens, PTL 1 (Japanese Unexamined Patent Application Publication No. H10-133203) and PTL 2 (Japanese Unexamined Patent Application Publication No. H11-64836), for example, propose a method of preventing entering light rays from falling on a light-shielding region, by providing a prism-shaped or cylindrical lens in a place corresponding to the light-shielding region. In the structure proposed in PTL 1 and PTL 2, when light with a divergence angle enters, many angle components are regularly reflected by the prism or the like. Thus, the light utilization efficiency does not increase, and image quality deterioration, such as flare, due to reflected light can also occur. In addition, also in terms of fabrication of a structure of a prism or a cylindrical lens, there is a significant productivity issue, such as variation in a prism angle, a curvature of the cylindrical lens, etc. Further, a shape protruding toward a liquid crystal layer causes many issues; for example, liquid crystal alignment disorder occurs, causing graininess or deterioration of a contrast ratio.

As another method, PTL 3 (Japanese Unexamined Patent Application Publication No. 2015-197577) proposes a method of increasing light utilization efficiency of a liquid crystal display device, by including a plurality of microlens arrays disposed in a thickness direction, and by providing a slit at a position corresponding to a light-shielding region in one microlens array. In the structure proposed in PTL 3, in a cross section in the thickness direction, for example, h/w is sufficiently larger than 1, assuming that the slit has a height (length in a vertical direction) of h and a width in a horizontal direction of w. The slit in the structure thus has a high aspect ratio. This method has a productivity issue, due to a difficulty in fabricating the slit structure with the high aspect ratio. Further, the configuration of a waveguide, in which total reflection by a wall of the slit is used to guide light to an opening, causes many issues; for example, polarization disorder of entering light occurs, causing deterioration of a contrast ratio.

1. FIRST EMBODIMENT

1.1 Circuit Configuration of Liquid Crystal Display Device

FIG. 1 schematically illustrates an example of a circuit configuration of a liquid crystal display device 10 according to a first embodiment of the present disclosure.

As described later, the liquid crystal display device 10 is to be used in, for example, a projection display such as a projector, and is a transmissive liquid crystal display device such as an HTPS (High Temperature Poly-Silicon), for example. The liquid crystal display device 10 includes a display region (an effective pixel region) 10a having a plurality of pixels P, a scan line driving circuit 110 and a signal line driving circuit 120 that are disposed on the periphery of the display region 10a, as well as a plurality of scan lines GL and a plurality of signal lines DL. It is to be noted that, in addition to these, there may also be provided a timing controller, and an image signal processor that performs various signal processing, both of which are unillustrated.

The signal line driving circuit 120 supplies image signals based on the image signals to the plurality of pixels P in sequence in a horizontal direction through the plurality of signal lines DL disposed in parallel along the horizontal direction. The scan line driving circuit 110 supplies gate signals (scan signals) to the plurality of pixels P in sequence in a vertical direction through the plurality of scan lines GL disposed in parallel along the vertical direction.

The plurality of pixels P is disposed at a position corresponding to each of intersection points of the plurality of signal lines DL and the plurality of scan lines GL, and is disposed two-dimensionally in a matrix form as a whole.

FIG. 2 schematically illustrates an example of a circuit configuration of one pixel in the liquid crystal display device 10 according to the first embodiment.

The pixel P includes, for example, a liquid crystal element LC, an auxiliary capacitor Cs, and a TFT (Thin-Film Transistor) 12. One end (a pixel electrode 31 to be described later) of the liquid crystal element LC is coupled to a drain of the TFT 12 and one end of the auxiliary capacitor Cs, and another end (a common electrode 41 to be described later) thereof is grounded, for example. The auxiliary capacitor Cs is a capacitor intended to stabilize stored charges of the liquid crystal element LC. The one end of the auxiliary capacitor Cs is coupled to the one end of the liquid crystal element LC and the drain of the TFT 12, and another end thereof is coupled to an auxiliary capacitor line CL. A gate and a source of the TFT 12 are respectively coupled to the scan line GL and the signal line DL, and the drain thereof is coupled to the one end of the liquid crystal element LC and the one end of the auxiliary capacitor Cs.

The liquid crystal element LC varies in light transmission rate depending on an image voltage to be supplied on the one end thereof through the TFT 12 from the signal line DL. The TFT 12 is a switching element to supply an image voltage based on an image signal to the one end of each of the liquid crystal element LC and the auxiliary capacitor Cs, and includes, for example, a MOS-FET (Metal Oxide Semiconductor-Field Effect Transistor).

In the liquid crystal display device 10, on the basis of an image signal inputted externally, the scan line driving circuit 110 selects the pixels P in a line-sequential manner, and the signal line driving circuit 120 supplies an image voltage corresponding to the image signal to each of the pixels P. This causes the pixels P to be display-driven to achieve image display.

1.2 Cross-Sectional Configuration and Action of Liquid Crystal Display Device (Cross-Sectional Configuration of Liquid Crystal Display Device)

FIG. 3 schematically illustrates a cross-sectional configuration example of the liquid crystal display device 10 according to the first embodiment. FIG. 3 illustrates an element structure substantially corresponding to two pixels P.

The liquid crystal display device 10 includes a liquid crystal layer 20, a drive substrate 30, a plurality of transmissive pixel electrodes 31 provided on the drive substrate 30, and a counter substrate 40 disposed to be opposed to the drive substrate 30 with the plurality of pixel electrodes 31 and the liquid crystal layer 20 interposed therebetween.

In addition, in the liquid crystal display device 10, an alignment film 22, the common electrode 41, and a high refractive index layer 42 are provided, in order from the liquid crystal layer 20 side, between the liquid crystal layer 20 and the counter substrate 40. A low refractive index layer 43 is provided in the high refractive index layer 42.

In addition, in the liquid crystal display device 10, an alignment film 21 is provided between the liquid crystal layer 20 and the plurality of pixel electrodes 31.

Each of the pixel electrode 31 and the common electrode 41 includes a transparent electrically-conductive film such as an ITO (indium tin oxide), for example. The common electrode 41 is provided between the liquid crystal layer 20 and the high refractive index layer 42.

Each of the alignment films 21 and 22 includes an insulating film such as, for example, silicon oxide ($SiO_2$). In addition, the alignment films 21 and 22 may include organic insulating materials. The alignment films 21 and 22 are formed by, for example, oblique vapor deposition, and are each about 200 nm in thickness.

Depending on the intended use, the liquid crystal layer 20 uses a liquid crystal of various modes. The liquid crystal layer 20 uses, for example, a vertical alignment type (a VA (Vertical Alignment) mode). In the liquid crystal of the VA mode, so-called pretilt is imparted to liquid crystal molecules to improve responsive characteristics to an applied voltage. An angle of the pretilt is 85 degrees assuming that a horizontal direction is 0 degree, for example. Refractive index anisotropy (Δn) of a constituent liquid crystal material for the liquid crystal layer 16 is, for example, 0.13, and dielectric constant anisotropy thereof is, for example, –3.5. The liquid crystal layer 16 has a thickness (a cell gap) of, for example, 2.7 μm. In addition, the liquid crystal layer 20 may use, for example, a liquid crystal of a TN (Twisted Nematic) mode, an ECB (Electrically controlled birefringence) mode, an FFS (Fringe Field Switching) mode, an IPS (In Plane Switching) mode, or the like.

Each of the drive substrate 30 and the counter substrate 40 includes a transparent substrate having light transmissive property.

The drive substrate 30 includes a light-shielding region (wiring region) 51 and a transmissive region (opening) 50. The pixel electrode 31 is provided at a position corresponding to the transmissive region 50 on the drive substrate 30.

The drive substrate 30 is a TFT substrate, and a wiring layer 33, a circuit element layer 34, and a light-shielding film 35 are formed therein, in order from the liquid crystal layer 20 side. An interlayer insulating film 32 is formed between the layers of the drive substrate 30. The interlayer insulating film 32 includes silicon oxide (SiO), for example. The wiring layer 33 includes a plurality of Al (aluminum) wiring lines 33A, 33B, and 33C. The wiring layer 33, the circuit element layer 34, and the light-shielding film 35 are formed in a region corresponding to the light-shielding region 51.

The circuit element layer 34 includes, for example, circuit elements, such as the auxiliary capacitor Cs and the TFT 12 (Thin Film Transistor) 12, provided for each pixel P as illustrated in FIG. 2.

The pixel electrode 31 is electrically coupled to the auxiliary capacitor Cs and the TFT 12 of the circuit element layer 34 through the wiring layer 33.

The high refractive index layer 42 includes a material having a first refractive index higher than a refractive index of the low refractive index layer 43 and the counter substrate 40. The low refractive index layer 43 is provided in at least a portion of a region corresponding to the light-shielding region 51 in the high refractive index layer 42. The low refractive index layer 43 includes a material having a second refractive index lower than the refractive index (first refractive index) of the high refractive index layer 42. The low refractive index layer 43 has a rectangular cross-sectional shape in a thickness direction. It is desirable that the cross-sectional shape of the low refractive index layer 43 in the thickness direction have a width w1 larger than a thickness d1 thereof. The low refractive index layer 43 may be formed in all of the region corresponding to the light-shielding region 51, or may be formed partly in the region corresponding to the light-shielding region 51. It is preferable that the width w1 of the low refractive index layer 43 be 50% or more, preferably 60% or more, with respect to a wiring width of the drive substrate 30 (a width of the light-shielding region 51). In addition, the width w1 of the low refractive index layer 43 may be larger than the wiring width of the drive substrate 30. As described later, the low refractive index layer 43 causes a diffraction action for entering light.

In the first embodiment, the high refractive index layer 42 corresponds to a specific example of a "first layer" in the technology of the present disclosure. In the first embodiment, the low refractive index layer 43 corresponds to a specific example of a "second layer" in the technology of the present disclosure.

The counter substrate 40 is a glass substrate, for example, and includes quartz (refractive index 1.46) or borosilicate glass (refractive index 1.51), for example. On the counter substrate 40, for example, a high refractive index material such as a silicon nitride (SiN) film or a silicon oxynitride (SiON) film is formed as the high refractive index layer 42. Next, a low refractive index material such as silicon oxide (SiO) is embedded. It is thus possible to form the rectangular low refractive index layer 43.

(Action of Liquid Crystal Display Device)

FIG. 4 schematically illustrates a configuration example of a liquid crystal display device 100 according to Comparative Example 1. FIG. 5 illustrates an example of an action of the liquid crystal display device 10 according to the first embodiment on entering light. FIG. 6 illustrates an example of an action of the liquid crystal display device 100 according to Comparative Example 1 on entering light.

The liquid crystal display device 100 according to Comparative Example 1 illustrated in FIG. 4 includes a light-shielding film 44, in place of the high refractive index layer 42 and the low refractive index layer 43 in the liquid crystal display device 10 according to the first embodiment. The light-shielding film 44 is provided in a region corresponding to the light-shielding region 51 between the counter substrate 40 and the common electrode 41.

In the liquid crystal display device 100 according to Comparative Example 1, light entering the counter substrate 40 is shielded by the light-shielding film 44, as illustrated in FIG. 6. Therefore, light entering the light-shielding film 44 does not reach the pixel electrode 31 and the transmissive region 50 of the drive substrate 30. This results in a decrease in light utilization efficiency.

In contrast, in the liquid crystal display device 10 according to the first embodiment, the low refractive index layer 43 provided on the counter substrate 40 side guides entering light to the pixel electrode 31 and the transmissive region 50 of the drive substrate 30 by the diffraction action, as illustrated in FIG. 5. Unlike a prism or a lens, the low refractive index layer 43 bends light on the basis of the principle of a diffraction phenomenon (electromagnetic optics), instead of the concept of geometrical optics (ray optics). The cross-sectional shape may therefore be a rectangular shape.

1.3 Example (Simulation of Light Utilization Efficiency)

FIG. 7 illustrates an example of a result of simulating, in terms of electromagnetic optics, light utilization efficiency of each of a liquid crystal display device according to Example 1 and the liquid crystal display device 100 according to Comparative Example 1.

In the liquid crystal display device according to Example 1, each part of the liquid crystal display device 10 according to the first embodiment has a configuration in the following simulation conditions. In addition, simulation conditions of the liquid crystal display device 100 according to Comparative Example 1 are similar to those of the liquid crystal display device according to Example 1, except for the configuration of the high refractive index layer 42 and the low refractive index layer 43. It is to be noted that FIG. 3 also illustrates a dimension value and the like of each part set as the simulation condition. However, the configuration of the liquid crystal display device 10 according to the first embodiment is not limited to the configuration set as the simulation conditions, and the dimension value, the material, and the like of each part may be another value and another material.

a pixel pitch p1: 6.3 μm
a wiring width w2: 1.4 μm
a refractive index n1 of the high refractive index layer 42: 1.67 (SiON)
a refractive index n2 of the low refractive index layer 43: 1.46 (SiO)
the thickness d1 of the low refractive index layer 43: 500 nm
the width w1 of the low refractive index layer 43: 1 μm FIG. 7 illustrates simulation values of utilization efficiency of light that is able to be taken in by a projection lens in a projector including a liquid crystal display device, on the precondition that an Fno (F-number) of the projection lens is 2.0. It is apparent from FIG. 7 that the liquid crystal display device according to Example 1 exhibits an improvement in the light utilization efficiency, as compared with the liquid crystal display device 100 according to Comparative Example 1.

1.4 Effects

As described above, in the liquid crystal display device 10 according to the first embodiment, the high refractive index layer 42 and the low refractive index layer 43 with the optimized refractive indices and shapes are provided between the counter substrate 40 and the liquid crystal layer 20, which improves light utilization efficiency.

In the liquid crystal display device 10 according to the first embodiment, on the counter substrate 40 side, the refractive index of the region corresponding to the light-shielding region (wiring region) 51 is made lower than the refractive index of the region corresponding to the transmissive region (opening) 50. Thus, it is possible to improve the light utilization efficiency, while reducing light applied to the wiring layer 33 of the drive substrate 30. This makes it possible to provide the bright liquid crystal display device 10. This makes it possible to provide a bright projector. Further, the improvement in the light utilization efficiency makes it possible to suppress heat generation due to light entering the liquid crystal display device 10, making it possible to provide a projector in which noise of a cooling fan is suppressed. In addition, the structure of the liquid crystal display device 10 according to the first embodiment is achievable by a simple and high-productivity process, as compared with a case of providing a structure, such as a prism, a lens, or a slit, on the counter substrate 40 side. This enables a reduction in cost.

It is to be noted that the effects described in the present specification are merely examples and not limitative, and other effects may be achieved. The same applies to effects of the following other embodiments.

1.5 Modification Examples

Although the liquid crystal display device 10 according to the first embodiment illustrates the configuration example in which the low refractive index layer 43 is formed on the common electrode 41, another layer may be formed between the low refractive index layer 43 and the common electrode 41.

Modification Example 1

FIG. 8 schematically illustrates a cross-sectional configuration example of a liquid crystal display device 10A according to Modification Example 1 of the first embodiment.

In the liquid crystal display device 10A according to Modification Example 1, as compared with the configuration of the liquid crystal display device 10 according to the first embodiment, the low refractive index layer 43 includes a step 43A and a flat layer 43B. The step 43A and the flat layer 43B have the same refractive index. As with the configuration of the low refractive index layer 43 in the liquid crystal display device 10 according to the first embodiment, the step 43A is formed in at least a portion of a region corresponding to the light-shielding region 51 in the high refractive index layer 42. As with the configuration of the low refractive index layer 43 in the liquid crystal display device 10 according to the first embodiment, the step 43A has a rectangular cross-sectional shape in the thickness direction, and causes a diffraction action for entering light.

The flat layer 43B is formed between the step 43A and the common electrode 41. Thus, another layer may be formed between the rectangular portion (the step 43A) of the low refractive index layer 43 and the common electrode 41.

In Modification Example 1 of the first embodiment, the step 43A corresponds to a specific example of the "second layer" in the technology of the present disclosure.

Other configurations, workings, and effects may be substantially similar to those of the liquid crystal display device 10 according to the first embodiment described above.

Modification Example 2

FIG. 9 schematically illustrates a cross-sectional configuration example of a liquid crystal display device 10B according to Modification Example 2 of the first embodiment.

In the liquid crystal display device 10B according to Modification Example 2, as compared with the configuration of the liquid crystal display device 10 according to the first embodiment, the low refractive index layer 43 is provided at a position further on the counter substrate 40 side in the thickness direction in the high refractive index layer 42. Thus, the high refractive index layer 42 is present also between the low refractive index layer 43 and the common electrode 41. That is, the low refractive index layer 43 is configured not to be in contact with the common electrode 41.

Other configurations, workings, and effects may be substantially similar to those of the liquid crystal display device 10 according to the first embodiment described above.

2. SECOND EMBODIMENT

Described next is a liquid crystal display device according to a second embodiment of the present disclosure. It is to be noted that, in the following, substantially the same portions as the components of the liquid crystal display device according to the first embodiment described above are denoted with the same reference numerals, and description thereof is omitted as appropriate.

2.1 Configuration

FIG. 10 schematically illustrates a cross-sectional configuration example of a liquid crystal display device 10C according to the second embodiment.

The liquid crystal display device 10C according to the second embodiment further includes a plurality of microlenses 45, as compared with the configuration of the liquid crystal display device 10 according to the first embodiment described above.

The microlens 45 is provided at a position corresponding to each of the plurality of pixel electrodes 32, between the high refractive index layer 42 and the counter substrate 40. The microlens 45 includes a high refractive index material such as a silicon oxynitride (SiON) film. The microlens 45 has a spherical lens shape, for example, and includes a material having a refractive index higher than that of the counter substrate 40 and the high refractive index layer 42, thus having positive refractive power. Thus, the microlens 45 has an effect of refracting entering light toward the pixel electrode 31 and the transmissive region 50 of the drive substrate 30.

It is to be noted that, in the liquid crystal display device 10C according to the second embodiment, it is also possible to make the configuration of the low refractive index layer 43 similar to the configuration in Modification Examples of the first embodiment described above.

2.2 Example (Simulation of Light Utilization Efficiency)

FIG. 11 schematically illustrates a cross-sectional configuration example of a liquid crystal display device 100C according to Comparative Example 2.

The liquid crystal display device 100C according to Comparative Example 2 illustrated in FIG. 11 has a configuration in which the high refractive index layer 42 and the low refractive index layer 43 in the liquid crystal display device 10C according to the second embodiment are omitted. In the liquid crystal display device 10C according to Example 2, the microlens 45 is formed in the counter substrate 40.

FIG. 12 illustrates an example of a result of simulating, in terms of electromagnetic optics, light utilization efficiency of each of the liquid crystal display device 10C according to Example 2 and the liquid crystal display device 100C according to Comparative Example 2.

In the liquid crystal display device according to Example 2, each part of the liquid crystal display device 10C according to the second embodiment has a configuration in the following simulation conditions. In addition, simulation conditions of the liquid crystal display device 100C according to Comparative Example 2 are similar to those of the liquid crystal display device according to Example 2, except for the configuration of the high refractive index layer 42 and the low refractive index layer 43. It is to be noted that FIG. 10 also illustrates a dimension value and the like of each part set as the simulation condition. However, the configuration of the liquid crystal display device 10C according to the second embodiment is not limited to the configuration set as the simulation conditions, and the dimension value, the material, and the like of each part may be another value and another material.

- the pixel pitch p1: 4.5 μm
- the wiring width w2: 1.4 μm
- the refractive index n1 of the high refractive index layer 42: 1.67 (SiON)
- the refractive index n2 of the low refractive index layer 43: =1.46 (SiO)
- the thickness d1 of the low refractive index layer 43: 500 nm
- the width w1 of the low refractive index layer 43: 1 μm
- the microlens 45: a spherical lens with a curvature radius of 4.5 μm, n=1.76 (SiON)

FIG. 12 illustrates simulation values of utilization efficiency of light that is able to be taken in by a projection lens in a projector including a liquid crystal display device, on the precondition that an Fno (F-number) of the projection lens is 2.0. It is apparent from FIG. 12 that the liquid crystal display device according to Example 2 exhibits an improvement in the light utilization efficiency, as compared with the liquid crystal display device 100C according to Comparative Example 2.

2.3 Effects

In the liquid crystal display device 10C according to the second embodiment, the high refractive index layer 42 and the low refractive index layer 43 with the optimized refractive indices and shapes are provided between the counter substrate 40 and the liquid crystal layer 20, and the microlens 45 is further provided between the high refractive index layer 42 and the counter substrate 40, which further improves the light utilization efficiency.

Other configurations, workings, and effects may be substantially similar to those of the liquid crystal display device 10 according to the first embodiment described above.

2.4 Modification Example

Modification Example 1

FIG. 13 schematically illustrates a cross-sectional configuration example of a liquid crystal display device 10D according to Modification Example 1 of the second embodiment.

In the liquid crystal display device 10D according to Modification Example 1, as compared with the configuration of the liquid crystal display device 10C according to the second embodiment, the microlens 45 is formed by a different method. In the liquid crystal display device 10D according to Modification Example 1, the high refractive index layer 42 and the microlens 45 are not separate layers, and the microlens 45 is formed by making a surface of the high refractive index layer 42 on the counter substrate 40 side have a lens shape.

It is to be noted that, in Modification Example 1 of the second embodiment, it is also possible to make the configuration of the low refractive index layer 43 similar to the configuration in Modification Examples of the first embodiment described above.

Other configurations, workings, and effects may be substantially similar to those of the liquid crystal display device 10C according to the second embodiment described above.

3. THIRD EMBODIMENT

Described next is a liquid crystal display device according to a third embodiment of the present disclosure. It is to be noted that, in the following, substantially the same portions as the components of the liquid crystal display device according to the first or second embodiment described above are denoted with the same reference numerals, and description thereof is omitted as appropriate.

3.1 Configuration

FIG. 14 schematically illustrates a cross-sectional configuration example of a liquid crystal display device 10E according to the third embodiment.

The liquid crystal display device 10E according to the third embodiment includes a multilayer C-plate (C-Plate) 42C, in place of the high refractive index layer 42, as compared with the configuration of the liquid crystal display device 10C according to the second embodiment illustrated in FIG. 10. The low refractive index layer 43 is formed in the multilayer C-plate 42C.

In the third embodiment, the multilayer C-plate 42C corresponds to a specific example of the "first layer" in the technology of the present disclosure.

The multilayer C-plate 42C is a negative C-plate, for example. The multilayer C-plate 42C has a configuration in which, for example, multiple silicon nitride (SiN) films and multiple silicon oxide (SiO) films are alternately stacked. The multilayer C-plate 42C includes a material having, as an average refractive index (effective refractive index), the first refractive index higher than the refractive index of the low refractive index layer 43 and the counter substrate 40. The multilayer C-plate 42C includes, for example, 150 layers of alternately stacked silicon nitride (SiN) films and silicon oxide (SiO) films each having a film thickness of 30 nm. In this case, the average refractive index (effective refractive index) of the multilayer C-plate 42C is 1.68.

It is to be noted that, in the third embodiment, it is also possible to make the configuration of the low refractive index layer 43 similar to the configuration in Modification Examples of the first embodiment described above.

3.2 Example (Simulation of Light Utilization Efficiency)

FIG. 15 schematically illustrates a cross-sectional configuration example of a liquid crystal display device 100E according to Comparative Example 3.

The liquid crystal display device 100E according to Comparative Example 3 illustrated in FIG. 15 has a configuration in which the low refractive index layer 43 in the liquid crystal display device 10E according to the third embodiment is omitted.

FIG. 16 illustrates an example of a result of simulating, in terms of electromagnetic optics, light utilization efficiency of each of a liquid crystal display device according to Example 3 and the liquid crystal display device 100E according to Comparative Example 3.

In the liquid crystal display device according to Example 3, each part of the liquid crystal display device 10E according to the third embodiment has a configuration in the following simulation conditions. In addition, simulation conditions of the liquid crystal display device 100E according to Comparative Example 3 are similar to those of the liquid crystal display device according to Example 3, except for the configuration of the low refractive index layer 43. It is to be noted that FIG. 14 also illustrates a dimension value and the like of each part set as the simulation condition. However, the configuration of the liquid crystal display device 10E according to the third embodiment is not limited to the configuration set as the simulation conditions, and the dimension value, the material, and the like of each part may be another value and another material.

the pixel pitch p1: 5.6 μm
the wiring width w2: 1.2 μm
the configuration of the multilayer C-plate 42C: a SiN/SiO stacked structure (150 layers, each 30 nm)
an average refractive index n1a of the multilayer C-plate 42C: =1.68
the refractive index n2 of the low refractive index layer 43: =1.46 (SiO)
the thickness d1 of the low refractive index layer 43: 500 nm
the width w1 of the low refractive index layer 43: 1 μm
the microlens 45: a spherical lens with a curvature radius of 4.5 μm, n=1.76 (SiON)

FIG. 16 illustrates simulation values of utilization efficiency of light that is able to be taken in by a projection lens in a projector including a liquid crystal display device, on the precondition that an Fno (F-number) of the projection lens is 2.0. It is apparent from FIG. 16 that the liquid crystal display device according to Example 3 exhibits an improvement in the light utilization efficiency, as compared with the liquid crystal display device 100E according to Comparative Example 3.

[3.3 Effects]

In the liquid crystal display device 10E according to the third embodiment, the multilayer C-plate 42C is used as the high refractive index layer 42 on the counter substrate 40 side, which further improves the light utilization efficiency.

Other configurations, workings, and effects may be substantially similar to those of the liquid crystal display device according to the first or second embodiment described above.

4. FOURTH EMBODIMENT

Described next is a liquid crystal display device according to a fourth embodiment of the present disclosure. It is to be noted that, in the following, substantially the same portions as the components of the liquid crystal display device according to any of the first to third embodiments described above are denoted with the same reference numerals, and description thereof is omitted as appropriate.

4.1 Configuration

FIG. 17 schematically illustrates a planar configuration example of a main part of a liquid crystal display device 10F according to the fourth embodiment.

In the liquid crystal display device 10F according to the fourth embodiment, as compared with, for example, the configuration of the liquid crystal display device according to the second or third embodiment described above, a position where the low refractive index layer 43 is provided in a plane is limited.

FIG. 17 illustrates an example of an in-plane configuration of the light-shielding region 51 and the transmissive region 50 in the drive substrate 30. The light-shielding region 51 corresponds to the wiring region. The transmissive region 50 corresponds to the opening of the pixel P in the liquid crystal display device 10F. In the plane, a region, of the wiring region, corresponding to a diagonal direction (a pixel corner 52) is larger than another region thereof. In the liquid crystal display device 10F according to the fourth embodiment, the low refractive index layer 43 is provided only for the region, of the wiring region, corresponding to the pixel corner 52 in a pixel plane. It is to be noted that FIG. 17 illustrates a configuration example in a case where, in the plane, the low refractive index layer 43 has a size smaller than the wiring region of the pixel corner 52. However, a configuration in which the in-plane size of the low refractive index layer 43 is the same as the wiring region or larger than the wiring region may be adopted.

A dimension of each part of the liquid crystal display device 10F according to the fourth embodiment is the following value, for example. In a case where the dimension of each part is the following value, the pixel P has an aperture ratio of 69%. However, the dimension of each part of the liquid crystal display device 10F according to the fourth embodiment is not limited to the value given below, and may be another value.

the pixel pitch p1: 7.2 μm
a planar shape of the low refractive index layer 43: 2.4 μm square
the curvature radius of the microlens 45: 5.1 μm Other configurations, workings, and effects may be substantially similar to those of the liquid crystal display device 10 according to the second or third embodiment described above.

4.2 Effects

In the liquid crystal display device 10F according to the fourth embodiment, it is possible to improve light utilization efficiency with the configuration in which the low refractive index layer 43 is provided in a minimum necessary region.

5. FIFTH EMBODIMENT

Described next is a liquid crystal display device according to a fifth embodiment of the present disclosure. It is to be noted that, in the following, substantially the same portions as the components of the liquid crystal display device according to any of the first to fourth embodiments described above are denoted with the same reference numerals, and description thereof is omitted as appropriate.

FIG. 18 schematically illustrates a cross-sectional configuration example of a liquid crystal display device 10G according to the fifth embodiment. FIG. 19 is an enlarged view of a cross-sectional configuration around a low refractive index region 40A of the counter substrate 40 in the liquid crystal display device 10G illustrated in FIG. 18. FIG. 20 is an enlarged view of a cross-sectional configuration around an inter-pixel region 60A of a drive substrate 60 in the liquid crystal display device 10G illustrated in FIG. 18.

The liquid crystal display device 10G according to the fifth embodiment is a reflective liquid crystal display device, for example, a LCOS (Liquid Crystal on Silicon). The liquid crystal display device 10G includes the liquid crystal layer 20, the drive substrate 60, a plurality of reflective pixel electrodes 61 provided on the drive substrate 60, and the counter substrate 40 disposed to be opposed to the drive substrate 60 with the plurality of pixel electrodes 61 and the liquid crystal layer 20 interposed therebetween.

In the liquid crystal display device 10G, the configuration on the counter substrate 40 side may be substantially similar to the configuration in the liquid crystal display device 10 according to the first embodiment described above. It is to be noted that FIG. 18 illustrates an example in which the configuration on the counter substrate 40 side corresponds to the liquid crystal display device 10A (FIG. 8) according to Modification Example 1 of the first embodiment. That is, FIG. 18 illustrates a configuration example in which the low refractive index layer 43 includes the step 43A and the flat layer 43B. In the liquid crystal display device 10G, the rectangular portion (the step 43A) of the low refractive index layer 43 is provided in at least a portion of a region corresponding to a location between the plurality of reflective pixel electrodes 61 (between the pixels).

The drive substrate 60 is a Si (silicon) substrate, for example, and a wiring layer 63 and a circuit element layer 64 are formed therein, in order from the liquid crystal layer 20 side. An interlayer insulating film 62 is formed between the layers of the drive substrate 60. The wiring layer 63 includes, for example, a plurality of Al (aluminum) wiring lines. The circuit element layer 64 includes, for example, a Cu (copper) wiring line, a Tr (transistor) element, and the like.

The pixel electrode 61 is electrically coupled to the circuit element layer 64 through the wiring layer 63. The pixel electrode 61 is, for example, a reflecting electrode including Al (aluminum). A high reflection coating 66 and a high reflection coating 67 are formed between the pixel electrode 61 and the alignment film 21. The high reflection coating 66 and the high reflection coating 67 serve to improve reflectance of the pixel electrode 61. The high reflection coating 66 includes a silicon oxide (SiO) film, for example, and the high reflection coating 67 includes a silicon nitride (SiN) film, for example.

FIG. 21 schematically illustrates a cross-sectional configuration example of a liquid crystal display device 100G according to Comparative Example 4. The liquid crystal display device 100G according to Comparative Example 4 has, as compared with the configuration of the liquid crystal display device 10G according to the fifth embodiment, a configuration in which the high refractive index layer 42 and the low refractive index layer 43 on the counter substrate 40 side are omitted. In the liquid crystal display device 100G according to Comparative Example 4, light that has entered the region corresponding to the location between the plurality of pixel electrodes 61 (between the pixels) on the counter substrate 40 side enters the location between the pixels as it is. In contrast, in the liquid crystal display device 10G according to the fifth embodiment, it is possible to guide light entering the region corresponding to the location between the pixels on the counter substrate 40 side to the pixel electrode 61, by the diffraction action of the rectangular portion (the step 43A) of the low refractive index layer 43. Thus, it is possible to improve light utilization efficiency, as compared with the liquid crystal display device 100G according to Comparative Example 4.

It is to be noted that FIG. 18 to FIG. 20 illustrate specific examples of a dimension and a material of each part of the liquid crystal display device 10G according to the fifth embodiment. However, the configuration of the liquid crystal display device 10G according to the fifth embodiment is not limited to the specific examples illustrated in FIG. 18 to FIG. 20, and the dimension value, the material, and the like of each part may be another value and another material. It is to be noted that dimensions and materials of representative portions are as follows.

the pixel pitch p1: 4.0 μm
an inter-pixel width w3: 250 nm
the refractive index n1 of the high refractive index layer 42: 1.67 (SiON)
the refractive index n2 of the low refractive index layer 43: 1.46 (SiO)
the thickness d1 of the rectangular portion (the step 43A) of the low refractive index layer 43: 200 nm the width w1 of the rectangular portion (the step 43A) of the low refractive index layer 43: 250 nm Other configurations, workings, and effects may be substantially similar to those of the liquid crystal display device 10 according to the first embodiment described above.

6. SIXTH EMBODIMENT

Described next is a liquid crystal display device according to a sixth embodiment of the present disclosure. It is to be noted that, in the following, substantially the same portions as the components of the liquid crystal display device according to any of the first to fifth embodiments described above are denoted with the same reference numerals, and description thereof is omitted as appropriate.

6.1 Overview

The above second embodiment describes the configuration example including the microlens 45 on the counter substrate 40 side (a light input side with respect to the liquid crystal layer 20) (e.g., FIG. 10 and FIG. 13). However, a configuration including a microlens also on the drive substrate 30 side (a light output side with respect to the wiring layer 33) may be adopted. In addition, in an optical axis direction, a plurality of microlenses may be provided on at least one of the counter substrate 40 side or the drive substrate 30 side for one pixel. Prior to a description of the liquid crystal display device according to the sixth embodiment, described below are issues that arise in a case where at least one microlens is disposed on both of the counter substrate 40 side and the drive substrate 30 side in the optical axis direction.

In recent years, although heat generation has become an issue in transmissive liquid crystal display devices, few documents focus on the heat generation. Examples of documents that focus on transmittance instead include documents of PTL 4 (Japanese Unexamined Patent Application Publication No. 2018-100994) and PTL 5 (Japanese Unexamined Patent Application Publication No. 2011-22311). However, both liquid crystal display devices disclosed in PTL 4 and PTL 5 fail to provide a sufficient solution to the heat generation issue. Described below are specific concerns of the liquid crystal display devices disclosed in PTL 4 and PTL 5.
Will be seen.

FIG. 22 schematically illustrates a main part of a liquid crystal display device 100H according to Comparative Example 6-1. FIG. 22 briefly illustrates, as the liquid crystal display device 100H according to Comparative Example 6-1, the liquid crystal display device disclosed in FIG. 3 of PTL 4. It is to be noted that FIG. 22 illustrates only a configuration of a portion corresponding to one pixel. In addition, FIG. 22 illustrates light rays based on ray tracing by ray tracing software.

The liquid crystal display device 100H according to Comparative Example 6-1 is a transmissive liquid crystal display device, and includes a liquid crystal layer 200, and an active-matrix wiring layer 330. A transmissive pixel electrode is provided between the liquid crystal layer 200 and the wiring layer 330.

The liquid crystal display device 100H according to Comparative Example 6-1 further includes, in the optical axis direction, a first microlens ML1, a second microlens ML2, and a third microlens ML3 at a position corresponding to the pixel electrode. The first microlens ML1 and the second microlens ML2 are provided on the light input side with respect to the liquid crystal layer 200. The third microlens MU is provided on the light output side with respect to the wiring layer 330. The first microlens ML1 is convex toward the light input side, the second microlens ML2 is convex toward the light output side, and the third microlens ML3 is convex toward the light output side.

The liquid crystal display device 100H according to Comparative Example 6-1 includes the relatively thick wiring layer 330. Referring to the ray tracing result of FIG. 22, in the liquid crystal display device 100H according to Comparative Example 6-1, light rays (an on-axis bundle of light rays L10) outputted from one on-axis point at an entrance surface are not parallel light at a position P10 after being outputted from the second microlens ML2. Then, light rays close to parallel light are outputted at an output surface P20. This means that a conjugate image is not formed. In the configuration of the liquid crystal display device 100H according to Comparative Example 6-1, an output wavefront is in a discrete state, and light rays are not present in all parts of one pixel. Therefore, light rays virtually seem as if having passed through a discrete diffraction grating, and output light diffracts greatly.

FIG. 23 briefly illustrates a configuration example of a typical transmissive projector.

In the typical transmissive projector, a projection lens 121 is disposed behind a liquid crystal display device 101, and light is projected on a projection surface 122, as in FIG. 23. Therefore, in a case of a configuration in which output light diffracts greatly as in the liquid crystal display device 100H according to Comparative Example 6-1, the diffraction of the output light causes a decrease in an amount of light taken into the projection lens 121. Consequently, to perform projection at a given brightness, an amount of light entering the liquid crystal display device 100H has to be increased, which also increases an amount of generated heat.

FIG. 24 schematically illustrates a main part of a liquid crystal display device 100I according to Comparative Example 6-2. FIG. 24 briefly illustrates, as the liquid crystal display device 100H according to Comparative Example 6-2, the liquid crystal display device disclosed in FIG. 1 of PTL 5.

The liquid crystal display device 100I according to Comparative Example 6-2 is a transmissive liquid crystal display device, and includes the liquid crystal layer 200 and the wiring layer 330. A pixel aperture 331 and a black matrix 332 are provided in the wiring layer 330.

The liquid crystal display device 100I according to Comparative Example 6-2 further includes, in the optical axis direction, the first microlens ML1, the second microlens ML2, and the third microlens ML3 at a position corresponding to the pixel aperture 331. The first microlens ML1 is provided on the light input side with respect to the liquid crystal layer 200. The second microlens ML2 and the third microlens MU are provided on the light output side with respect to the wiring layer 330. The first microlens ML1, the second microlens ML2, and the third microlens MU are each convex toward the light input side side.

The liquid crystal display device 100I according to Comparative Example 6-2 has a configuration in which the liquid crystal layer 200 and the wiring layer 330 are relatively thin. However, in recent years, the thickness of the wiring layer 330 is generally around 5 micrometers, and the pixel pitch is generally 6 micrometers or less. Thus, the thickness of the wiring layer 330 and the pitch of one pixel are similar dimensions. If the wiring layer 330 is made thick comparably to the pixel pitch in the liquid crystal display device 100I according to Comparative Example 6-2, a NA of the on-axis bundle of light rays L10 particularly becomes too large, causing significant light ray interference. This means an increase in heat generated by the liquid crystal display device 100I.

In view of the situation described above, a configuration of a liquid crystal display device with a smaller amount of generated heat is proposed as the liquid crystal display device according to the sixth embodiment. Particularly emphasized points are three points.

1. Taking-in efficiency of the projection lens 121 is improved. A behavior in diffractive optics is emphasized in the improvement, and a wavefront state of output light rays is made as continuous and unbroken as possible to reduce contribution of output diffracted light. To achieve this, conjugate image formation at substantially one-time magnification has to be kept.

2. Transmittance in the wiring layer 33 is improved. Particularly taking into account a diffractive factor as compared with geometric light rays, light rays are caused to enter the wiring layer 33 with a higher NA, thereby reducing a spot diameter limit value due to a diffraction limit. Further, on-axis light rays substantially close to parallel are caused to pass through the wiring layer 33 to reduce loss in the relatively thick wiring layer 33.

3. As with the liquid crystal display device according to the first embodiment and the like described above, a structure with a refractive index difference is provided on the light input side with respect to the liquid crystal layer 20, thereby concentrating an electric field of light into the opening (the transmissive region 50) in terms of diffractive optics, and reducing absorptance in the wiring layer 33.

Described below are configurations and workings of the liquid crystal display device according to the sixth embodiment, on the basis of specific Examples. However, the configuration of the liquid crystal display device according to the sixth embodiment is not limited to the configurations described in the following Examples, and the dimension value, the material, and the like of each part may be another value and another material.

The liquid crystal display device according to each of the following Examples is transmissive, and includes, in the optical axis direction, three or more microlenses provided at a position corresponding to each of the plurality of pixel electrodes 31. In the liquid crystal display device according to each Example, at least one of the three or more microlenses is provided on each of the light input side with respect to the liquid crystal layer 20 and the light output side with respect to the wiring layer 33. In the liquid crystal display device according to each Example, the three or more microlenses allow an entering bundle of light rays to form an image on the light output side with respect to the liquid crystal layer 20. In addition, in the configuration, a distance in air between conjugate image formation positions of an image formation position on the light input side and an image formation position on the light output side by the three or more microlenses is larger than a distance in air between, of the three or more microlenses, the microlens farthest on the light input side and the microlens farthest on the light output side (the distance between the conjugate image formations is longer than the distance between the outermost lenses).

In the liquid crystal display device according to the sixth embodiment, it is desirable that the magnification of the conjugate image formation by the three or more microlenses be equal to or more than 0.7 times and equal to or less than 1.3 times.

In addition, it is desirable that the liquid crystal display device according to the sixth embodiment satisfy the following conditional expression.

$$0.8 \le f_{before}/f_{after} \le 1.2 \quad (1), \text{where}$$

$f_{before}$: a combined focal length in air of the at least one microlens, of the three or more microlenses, provided on the light input side with respect to the liquid crystal layer 20; and $f_{after}$: a combined focal length in air of the at least one microlens, of the three or more microlenses, provided on the light output side with respect to the wiring layer 33.

In addition, it is desirable that the liquid crystal display device according to the sixth embodiment satisfy the following conditional expression.

$$0.8 \le t_{Lbefore\text{-}Wire}/t_{Wire\text{-}Lafter} \le 1.2 \quad (2), \text{where}$$

$t_{Lbefore\text{-}Wire}$: a length in air from the microlens provided at a position closest to the wiring layer 33, of the at least one microlens provided on the light input side with respect to the liquid crystal layer 20, to the wiring layer 33; and $t_{Wire\text{-}Lafter}$: a length in air from the wiring layer 33 to the microlens provided at a position closest to the wiring layer 33, of the at least one microlens provided on the light output side with respect to the wiring layer 33.

In addition, it is desirable that, in the liquid crystal display device according to the sixth embodiment, two of the three or more microlenses be provided on the light input side with respect to the liquid crystal layer 20, as in Examples 6-1 to 6-3 to be described later, and that the following conditional expression be satisfied.

$$0.65 \le f_{before}/t_{Lbeforebetween} \le 1.35 \quad (3), \text{where}$$

$f_{before}$: a combined focal length in air of the two microlenses provided on the light input side with respect to the liquid crystal layer 20; and $t_{Lbeforebetween}$: a length in air between the two microlenses provided on the light input side with respect to the liquid crystal layer 20.

In addition, it is desirable that, in the liquid crystal display device according to the sixth embodiment, two of the three or more microlenses be provided on the light output side with respect to the wiring layer 33, as in Example 6-4 to be described later, and that the following conditional expression be satisfied.

$$0.65 \le f_{after}/t_{Lafterbetween} \le 1.35 \quad (4), \text{where}$$

$f_{after}$: a combined focal length in air of the two microlenses provided on the light output side with respect to the wiring layer 33; and $t_{Lafterbetween}$: a length in air between the two microlenses provided on the light output side with respect to the wiring layer 33.

In addition, it is desirable that the liquid crystal display device according to the sixth embodiment satisfy the following conditional expression.

$$1.59/\varphi_{Wire} \le n_{Wire} \cdot \sin \theta_{Wire} \quad (5), \text{where}$$

$n_{Wire}$: a refractive index of the wiring layer 33;

$\theta_{Wire}$: an angle of a light ray that passes through the wiring layer 33; and $\varphi_{Wire}$: an inscribed circle diameter [μm] of the transmissive region 50 at one pixel electrode 31.

6.2 Examples

Example 6-1

FIG. 25 schematically illustrates a main part of a liquid crystal display device 10H1 according to Example 6-1. FIG. 26 illustrates an example of a state of an output diffraction angle in the liquid crystal display device 10H1 according to Example 6-1. FIG. 27 schematically illustrates a main part of a liquid crystal display device 100J according to Comparative Example 6-3. FIG. 28 illustrates an example of a state of an output diffraction angle in the liquid crystal display device 100J according to Comparative Example 6-3. FIG. 29 schematically illustrates a planar configuration example of the opening (the transmissive region 50) and the light-shielding region (wiring region) 51 of the wiring layer 33 in the liquid crystal display device 10H1 according to Example 6-1. It is to be noted that FIG. 25 and FIG. 27 illustrate only a configuration of a portion corresponding to one pixel. In addition, FIG. 25 and FIG. 27 illustrate light rays based on ray tracing by ray tracing software.

As illustrated in FIG. 25, the liquid crystal display device 10H1 according to Example 6-1 includes, in the optical axis direction, the first microlens ML1, the second microlens ML2, and the third microlens ML3 provided at a position corresponding to one pixel electrode 31. The first microlens ML1 and the second microlens ML2 are provided on the light input side with respect to the liquid crystal layer 20. The third microlens ML3 is provided on the light output side with respect to the wiring layer 33. A C-plate 36 is provided between the third microlens ML3 and the wiring layer 33.

In the liquid crystal display device 10H1 according to Example 6-1, the first microlens ML1, the second microlens ML2, and the third microlens ML3 allow an entering bundle of light rays to form an image on the light output side with respect to the liquid crystal layer 20. For example, the on-axis bundle of light rays L10 forms an image at an image formation position P30. In addition, in the configuration, the distance in air between the conjugate image formation positions of the image formation position on the light input side and the image formation position P30 on the light output side by the first microlens ML1, the second microlens ML2, and the third microlens MU is larger than the distance in air between the first microlens ML1 farthest on the light input side and the third microlens MU farthest on the light output side.

Table 1 shows an example of optical parameters of the liquid crystal display device 10H1 according to Example 6-1. In Table 1, "Type" indicates a type of an optical element. "ITO" of "Type" indicates the common electrode 41 or the pixel electrode 31. "Si" indicates the number of an i-th surface assigned with a reference numeral sequentially increasing from a surface farthest on an object side. "Ri" indicates a value (μm) of a paraxial curvature radius of the i-th surface. "Di" indicates a value (μm) of an interval on an optical axis between the i-th surface and an i+1-th surface. "Ni" indicates a value of a refractive index of a material of the optical element having the i-th surface. "Conic" indicates a conic constant representing an aspherical shape.

Table 2 shows various calculation parameters of the liquid crystal display device 10H1 according to Example 6-1. In Table 2, $f_1$ indicates a focal length in air of the first microlens ML1, $f_2$ indicates a focal length in air of the second microlens ML2, and $f_3$ indicates a focal length in air of the third microlens ML3. $f_{12}$ indicates a combined focal length in air of the first microlens ML1 and the second microlens ML2. $t_{L2}$ indicates a total length in air of surfaces S1 to S3. $t_{L2\text{-}Wire}$ indicates a total length in air of surfaces S3 to S6. $t_{Wire\text{-}L3}$ indicates a total length in air of surfaces S8 to S9. $NA_{Wire}$ indicates a NA when passing through the wiring layer 33.

TABLE 1

Example 6-1

| Type | Si | Ri[μm] | Conic | Di[μm] | Ni |
|---|---|---|---|---|---|
|  | 0 | ∞ |  | 0.1 | 1.46 |
| ML1 | 1 | 4.80 | −0.32295 | 3.2 | 1.67 |
|  | 2 | ∞ |  | 8.0 | 1.46 |
| ML2 | 3 | 3.72 |  | 2.8 | 1.8 |
| ITO | 4 | ∞ |  | 0.1 | 1.95 |
| Liquid crystal layer | 5 | ∞ |  | 3.3 | 1.55 |
| ITO | 6 | ∞ |  | 0.1 | 1.95 |
| Wiring layer | 7 | ∞ |  | 5.3 | 1.46 |
| C-Plate | 8 | ∞ |  | 4.3 | 1.67 |
| ML3 | 9 | ∞ |  | 2.4 | 1.9 |
|  | 10 | −3.70 |  | 0.9 | 1.46 |
|  | 11 | ∞ |  | 10.0 | 1.46 |

TABLE 2

Example 6-1

| | |
|---|---|
| Image formation magnification | 1.0 |
| $f_1$[μm] | 22.6 |
| $f_2$[μm] | 10.9 |
| $f_{12}$[μm] | 9.4 |
| $f_3$[μm] | 8.3 |
| $t_{L12}$[μm] | 8.9 |
| $t_{L2\text{-}Wire}$[μm] | 3.8 |
| $t_{Wire\text{-}L3}$[μm] | 3.8 |
| $NA_{Wire}$ | 0.489 |
| $f_{12}/f_3$ | 113% |
| $t_{L2\text{-}Wire}/t_{Wire\text{-}L3}$ | 100% |
| $f_{12}/t_{L12}$ | 105% |

The liquid crystal display device 100J according to Comparative Example 6-3 has a configuration including only two microlenses, as compared with the liquid crystal display device 10H1 according to Example 6-1. That is, in the configuration, the first microlens ML1 is provided on the light input side with respect to the liquid crystal layer 20, and the second microlens ML2 is provided on the light output side with respect to the wiring layer 33. In addition, the liquid crystal display device 100J according to Comparative Example 6-3 has a configuration in which the low refractive index layer 43 is omitted, as compared with the liquid crystal display device 10H1 according to Example 6-1.

As illustrated in FIG. 29, the pixel pitch of the liquid crystal display device 10H1 according to Example 6-1 is 5.6 μm. In addition, the transmissive region (opening) 50 in the wiring layer 33 corresponds to φ4.3 μm ($=\varphi_{Wire}$) in inscribed circle diameter, and an input F-number is 2 (NAin=0.25). Geometric light rays that pass through the liquid crystal display device 10H1 according to Example 6-1 are as illustrated in FIG. 25.

Referring to FIG. 25, light rays that enter the surface S1 are in an image forming state when outputted, and an image is formed at the image formation position P30 much ahead of the third microlens ML3. This image formation magnification is 1.0 time as shown in Table 2. Therefore, excluding aberration, an output image height substantially matches an input image height at the surface S1. Thus, in the liquid crystal display device 10H1 according to Example 6-1, the output wavefront is neatly continuous without a gap if adjacent pixels are arranged, and it is observed as if a plane wave with no gap is outputted from the output side. This reduces output diffraction. The states of the output diffraction angle illustrated in FIG. 26 and FIG. 28 were calculated by RCWA (rigorous coupled-wave analysis), with a wavelength of entering light set to 550 nm and an entry angle set to 0 deg. If an output angle is compared between Example 6-1 and Comparative Example 6-3, a diffraction angle is narrowed in Example 6-1 as compared with Comparative Example 6-3, resulting in an increase in the amount of light taken into the projection lens 121.

In the liquid crystal display device 10H1 according to Example 6-1, the combined focal length $f_{12}$ of the first microlens ML1 and the second microlens ML2 is roughly equal to the focal length $f_3$ of the third microlens MU. In addition, the combined focal length $f_{12}$ is substantially equal to a length in air $t_{L12}$ from the first microlens ML1 to the second microlens ML2. Thus, the on-axis bundle of light rays L10 outputted from on the optical axis passes through the wiring layer 33, being substantially parallel to the optical axis, to form a conjugate image with a magnification close to one time on the output side.

In FIG. 25, a wiring entry angle at the maximum image height (2.8 μm×√2=4.0 μm) is also large, and this reaches $NA_{Wire}$=0.519 in NA. By thus achieving a high NA, it is possible to make a spot size of image formation at the wiring layer 33 sufficiently small. If the spot size is estimated with the aid of Rayleigh resolution, an expanded spot size radius δ is expressed by the following expression (A).

$$\delta = 1.22 \lambda / N_{Wire} \quad (A)$$

If the longest wavelength λ=650 nm is adopted, assuming the use of any color light of R, G, and B, the following expression (B) holds.

$$\delta = 1.52 \,[\mu m] \quad (B)$$

The spot size expands more than in geometrical optical tracking in accordance with the expression (B), which causes loss. Therefore, the $NA_{Wire}$ as large as possible is desirable. As a guide, if δ is 50% or less of the aperture inscribed circle $\varphi_{Wire}$ [μm], exerted influence is relatively minor. That is, the following expressions (C) and (D) hold.

$$\delta \leq 0.5 \varphi_{Wire} \quad (C)$$

$$1.59/\varphi_{Wire} \leq NA_{Wire} \quad (D)$$

To achieve the high $NA_{Wire}$, it is desirable that the refractive indices of the second microlens ML2 and the third microlens MU include high refractive indices exceeding 1.7. In addition, in the liquid crystal display device 10H1 according to Example 6-1, light rays pass through the C-plate 36 at the same angle as through the liquid crystal layer 20, which enables a reduction in contrast.

In the liquid crystal display device 10H1 according to Example 6-1, the step structure with the refractive index difference including the high refractive index layer 42 and the low refractive index 43 is provided on the light input side with respect to the liquid crystal layer 20, as with the liquid crystal display device according to the first embodiment and the like described above. This enables a further reduction in temperature. As illustrated in FIG. 25, there is refractive index distribution with a refractive index of 1.46, a thickness of 200 nm, and a size equal to the wiring shape in the second microlens ML2, and electric field distribution is further concentrated on the center of the aperture of the wiring layer 33. FIG. 29 illustrates a top configuration of the transmissive region (opening) 50 and the light-shielding region (wiring region) 51 of the wiring layer 33. The configuration of the opening and the wiring region is the same in the following other Examples as well. The refractive index distribution is equal to the shape of this wiring region. That is, with respect to the thickness 200 nm of the refractive index distribution, its breadth is large (at least 800 nm, taking a periodic structure into account).

Table 3 shows the taking-in efficiency of the projection lens 121 and absorptance of the liquid crystal display device, for the liquid crystal display device 100J according to Comparative Example 6-3 and the liquid crystal display device 10H1 according to Example 6-1.

TABLE 3

|  | Projection lens taking-in efficiency | Absorptance |
| --- | --- | --- |
| Comparative Example Example 6-3 | 65.0% | 18.4% |
| Example 6-1 | 77.8% | 7.3% |

In Table 3, the taking-in efficiency indicates a degree to which output light is able to be taken into the projection lens 121 with F-number=1.75. This calculation was also performed by RCWA. Both the taking-in efficiency and the absorptance exhibit a drastic improvement. The liquid crystal display device 10H1 according to Example 6-1, as compared with the liquid crystal display device 100J according to Comparative Example 6-3, exhibits 19.7% higher taking-in efficiency, and the absorptance improved to 1/2.52 times. An overall improvement rate is the product of the two improvement rates. In the liquid crystal display device 10H1 according to Example 6-1, as compared with the liquid crystal display device 100J according to Comparative Example 6-3, a total amount of heat absorbed becomes 1/2.97 times on the basis of the respective relative ratios. That is, this indicates achievement of a drastic improvement in temperature, and a temperature rise amount ΔT from room temperature improved by 1/2.97 times. In other words, this means that in a transmissive liquid crystal display device that has exhibited ΔT=60° C. at a given light amount, ΔT≈20° C. is achieved. Excluding the viewpoints of light resistance and lifetime, it is possible to keep an equivalent amount of generated heat even in a case where the brightness is increased by about three times. Thus, the liquid crystal display device 10H1 according to Example 6-1 brings about a drastic improvement effect.

The configuration of the liquid crystal display device 10H1 according to Example 6-1 is particularly effective for a transmissive liquid crystal display device with a pixel pitch of 6 μm or less and including the relatively thick liquid crystal layer 20 (3 μm to 4 μm). While keeping the high $NA_{Wire}$ as shown in Table 2 to reduce the spot diameter in the wiring layer 33, the output diffracted light is reduced. Further, a concentrated electric field is formed at the opening by a diffraction effect caused by the refractive index difference structure. These in combination make it possible to reduce the temperature. There has been no other example in which an overall design is optimized by focusing particularly on an output diffracted light reduction effect caused by the output magnification being close to one time. In addition, there has been no other example having such a drastic temperature reduction effect. A great effect is achieved particularly by the configuration in which "the distance between the conjugate image formations is longer than the distance between the outermost lenses" serving as a condition for achievement of substantially one-time magnification image formation while avoiding the thick wiring layer 33. A typical design emphasizes light ray control at an output image formation position, as seen in PTL 5 (Japanese Unexamined Patent Application Publication No. 2011-22311). In other words, in the design, a microlens is disposed at the output image formation position to change a light ray direction. The liquid crystal display device 10H1 according to Example 6-1 disturbs this configuration, and uses a configuration in which two microlenses are disposed on the light input side with respect to the liquid crystal layer 200 and one microlens is disposed on the light output side with respect to the wiring layer 330. The point is that conjugation at one-time magnification is achieved with the configuration with disturbed symmetry.

The liquid crystal display device 10H1 according to Example 6-1 has an effect of concealing the wiring region, as a secondary effect. Because an input image is formed by image formation with a magnification close to one time, an output conjugate image has a size substantially equivalent to one pixel, and it is possible to make the wiring region hardly visible even though the liquid crystal display device is transmissive. The wiring region is one of great disadvantages for a transmissive liquid crystal display device, and solving this produces a great effect.

Further, as another secondary effect of the liquid crystal display device 10H1 according to Example 6-1, excluding diffraction, "output angle distribution is 1/magnification (=angular magnification) of entry angle distribution". Therefore, if the magnification is made close to one time, it is possible to make the output angle distribution substantially equivalent to the entry angle distribution, making it possible to keep the taking-in efficiency of the projection lens 121 at a relatively high efficiency also in terms of geometrical optics. From this viewpoint, a conjugate magnification slightly larger than 1 is relatively advantageous.

In the liquid crystal display device 10H1 according to Example 6-1, the combined focal length in air of the microlenses on the light input side with respect to the liquid crystal layer 20 is roughly equal to the combined focal length in air of the lens on the light output side with respect to the wiring layer 33. That is, with respect to the combined focal length in air $f_{12}$ ($=f_{before}$) of the first microlens ML1 and the second microlens ML2, a ratio, $f_{12}/f_3$, of the focal length in air $f_3$ ($=f_{after}$) of the third microlens ML3 is 113% (Table 2). It is desirable that this ratio fall within 80% to 120%. It is further desirable that this ratio fall within 85% to 115%. It is to be noted that this ratio is substantially equal to the conjugate magnification in a case where light rays passing through the wiring layer 33 are parallel to the optical axis (an upper light ray and a lower light ray of the on-axis bundle of light rays L10 in FIG. 25).

In addition, the liquid crystal display device 10H1 according to Example 6-1 has a configuration including the wiring layer 33 in the vicinity of the center between the second microlens ML2 and the third microlens ML3. According to Table 2, a ratio between the length in air $t_{L2\text{-}Wire}$ ($=t_{Lbefore\text{-}Wire}$) from the second microlens ML2 to the wiring layer 33 and the length in air $t_{Wire\text{-}L3}$ ($=t_{Wire\text{-}Lafter}$) from the wiring layer 33 to the third microlens ML3 is 100%. Also as this value, 80% to 120% is desirable, and 90% to 110% is further desirable. As this portion deviates from 100%, symmetry with respect to the wiring layer 33 is disturbed, and light ray vignetting in the wiring layer 33 thus increases, causing light amount loss and an increase in absorptance. If the microlens is increased in power, an output light ray angle increases.

Further, in the liquid crystal display device 10H1 according to Example 6-1, the combined focal length in air $f_{12}$ ($=f_{before}$) of the first microlens ML1 and the second microlens ML2 is substantially equal to the distance in air $t_{L12}$ ($=t_{Lbeforebetween}$) between the microlenses on the light input side with respect to the liquid crystal layer 20. A ratio between these two is 105% in Example 6-1 (Table 2). As this value, from 65% to 135% is desirable, and from 80% to 120% is further desirable.

Example 6-2

FIG. 30 schematically illustrates a main part of a liquid crystal display device 10H2 according to Example 6-2. It is to be noted that FIG. 30 illustrates only a configuration of a portion corresponding to one pixel. In addition, FIG. 30 illustrates light rays based on ray tracing by ray tracing software.

As illustrated in FIG. 30, the liquid crystal display device 10H2 according to Example 6-2 includes, in the optical axis direction, the first microlens ML1, the second microlens ML2, and the third microlens ML3 provided at a position corresponding to one pixel electrode 31, as with the liquid crystal display device 10H1 according to Example 6-1. In the liquid crystal display device 10H2 according to Example 6-2, the first microlens ML1 and the second microlens ML2 are provided on the light input side with respect to the liquid crystal layer 20, as with the liquid crystal display device 10H1 according to Example 6-1. In the liquid crystal display device 10H2 according to Example 6-2, the third microlens MU is provided on the light output side with respect to the wiring layer 33, as with the liquid crystal display device 10H1 according to Example 6-1. In the liquid crystal display device 10H2 according to Example 6-2, the C-plate 36 is provided between the third microlens MU and the wiring layer 33, as with the liquid crystal display device 10H1 according to Example 6-1.

In the liquid crystal display device 10H2 according to Example 6-2, the first microlens ML1, the second microlens ML2, and the third microlens ML3 allow an entering bundle of light rays to form an image on the light output side with respect to the liquid crystal layer 20, as with the liquid crystal display device 10H1 according to Example 6-1. For example, the on-axis bundle of light rays L10 forms an image at the image formation position P30. In addition, in the configuration, the distance in air between the conjugate image formation positions of the image formation position on the light input side and the image formation position P30 on the light output side by the first microlens ML1, the second microlens ML2, and the third microlens ML3 is larger than the distance in air between the first microlens ML1 farthest on the light input side and the third microlens ML3 farthest on the light output side.

In the liquid crystal display device 10H2 according to Example 6-2, the step structure with the refractive index difference including the high refractive index layer 42 and the low refractive index 43 is provided on the light input side with respect to the liquid crystal layer 20, as with the liquid crystal display device according to the first embodiment and the like described above. This enables a further reduction in temperature. As illustrated in FIG. 30, there is refractive index distribution with a refractive index of 1.46, a thickness of 200 nm, and a size equal to the wiring shape in the second microlens ML2, and electric field distribution is further concentrated on the center of the aperture of the wiring layer 33.

Table 4 shows an example of optical parameters of the liquid crystal display device 10H2 according to Example 6-2. Meanings of the optical parameters shown in Table 4 are similar to those in Table 1. In addition, Table 5 shows various calculation parameters of the liquid crystal display device 10H2 according to Example 6-2. Meanings of the various calculation parameters shown in Table 5 are similar to those in Table 2. In addition, Table 6 shows the taking-in efficiency of the projection lens 121 and the absorptance of the liquid crystal display device, for the liquid crystal display device 100J according to Comparative Example 6-3 and the liquid crystal display device 10H2 according to Example 6-2.

TABLE 4

Example 6-2

| Type | Si | Ri[μm] | Conic | Di[μm] | Ni |
|---|---|---|---|---|---|
|  | 0 | ∞ |  | 0.1 | 1.46 |
| ML1 | 1 | 4.95 | −0.3656 | 3.2 | 1.67 |
|  | 2 | ∞ |  | 4.9 | 1.46 |
| ML2 | 3 | 5.05 |  | 2.8 | 1.9 |
| ITO | 4 | ∞ |  | 0.1 | 1.95 |
| Liquid crystal layer | 5 | ∞ |  | 3.3 | 1.55 |
| ITO | 6 | ∞ |  | 0.1 | 1.95 |
| Wiring layer | 7 | ∞ |  | 5.3 | 1.46 |
| C-Plate | 8 | ∞ |  | 4.3 | 1.67 |
| ML3 | 9 | ∞ |  | 2.4 | 1.9 |
|  | 10 | −3.78 | −0.1744 | 0.9 | 1.46 |
|  | 11 | ∞ |  | 10.0 | 1.46 |

TABLE 5

Example 6-2

| Image formation magnification | 1.28 |
|---|---|
| $f_1$[μm] | 23.4 |
| $f_2$[μm] | 11.4 |
| $f_{12}$[μm] | 9.0 |
| $f_3$[μm] | 8.5 |
| $t_{L12}$[μm] | 6.7 |
| $t_{L2\text{-}Wire}$[μm] | 3.7 |
| $t_{Wire\text{-}L3}$[μm] | 3.8 |
| $NA_{Wire}$ | 0.503 |
| $f_{12}/f_3$ | 106% |
| $t_{L2\text{-}Wire}/t_{Wire\text{-}L3}$ | 98% |
| $f_{12}/t_{L12}$ | 134% |

TABLE 6

|  | Projection lens taking-in efficiency | Absorptance |
|---|---|---|
| Comparative Example | 65.0% | 18.4% |
| Example 6-2 | 77.6% | 7.4% |

In the liquid crystal display device 10H2 according to Example 6-2, the distance between the second microlens ML2 and the third microlens ML3 is relatively short, being about 74% of the combined focal length in air $f_{12}$ of the first microlens ML1 and the second microlens ML2. Also in the liquid crystal display device 10H2 according to Example 6-2, the taking-in efficiency and the absorptance substantially similar to those in the liquid crystal display device 10H1 according to Example 6-1 were obtained (Table 6). Therefore, the technology of the present disclosure holds even in a case where the on-axis bundle of light rays L10 is slightly tilted. It seems that a range of fluctuation of roughly around 30% does not raise concerns. In addition, in the liquid crystal display device 10H2 according to Example 6-2, the image formation magnification is also about 1.3 times, being larger than one time, but it is possible to keep the high taking-in efficiency. Therefore, it seems that the image formation magnification itself has a margin of about 0.3, and it is possible to keep the desired taking-in efficiency if the image formation magnification is about 0.7 times to 1.3 times. On the other hand, for the aforementioned effect of concealing the wiring region, it is preferable that the image formation magnification be as close to 1 as possible, preferably from 0.9 times to 1.1 times. According to the aforementioned discussion of the angular magnification, about 1.0 time to 1.1 times is further desirable.

Also in the liquid crystal display device 10H2 according to Example 6-2, it is apparent from Table 5 that the values of $f_{12}/f_3$, $t_{L2\text{-}Wire}/t_{Wire\text{-}L3}$, and $f_{12}/t_{L12}$ fall within ranges satisfying the conditional expressions (1) to (3) given above.

Example 6-3

FIG. 31 schematically illustrates a main part of a liquid crystal display device 10H3 according to Example 6-3. It is to be noted that FIG. 30 illustrates only a configuration of a portion corresponding to one pixel. In addition, FIG. 30 illustrates light rays based on ray tracing by ray tracing software.

As illustrated in FIG. 31, the liquid crystal display device 10H3 according to Example 6-3 further includes, in the optical axis direction, a fourth microlens ML4, in addition to the first microlens ML1, the second microlens ML2, and the third microlens ML3 provided at a position corresponding to one pixel electrode 31, as compared with the configuration of the liquid crystal display device 10H1 according to Example 6-1. In the liquid crystal display device 10H3 according to Example 6-3, the first microlens ML1 and the second microlens ML2 are provided on the light input side with respect to the liquid crystal layer 20, as with the liquid crystal display device 10H1 according to Example 6-1. In the liquid crystal display device 10H3 according to Example 6-3, the third microlens ML3 and the fourth microlens ML4 are provided on the light output side with respect to the wiring layer 33. In the liquid crystal display device 10H3 according to Example 6-3, the C-plate 36 is provided between the third microlens ML3 and the wiring layer 33, as with the liquid crystal display device 10H1 according to Example 6-1.

In the liquid crystal display device 10H3 according to Example 6-3, the first microlens ML1, the second microlens ML2, the third microlens ML3, and the fourth microlens ML4 allow an entering bundle of light rays to form an image on the light output side with respect to the liquid crystal layer 20. For example, the on-axis bundle of light rays L10 forms an image at the image formation position P30. In addition, in the configuration, the distance in air between the conjugate image formation positions of the image formation position on the light input side and the image formation position P30 on the light output side by the first microlens ML1, the second microlens ML2, the third microlens MU, and the fourth microlens ML4 is larger than the distance in air between the first microlens ML1 farthest on the light input side and the fourth microlens ML4 farthest on the light output side.

In the liquid crystal display device 10H3 according to Example 6-3, the step structure with the refractive index difference including the high refractive index layer 42 and the low refractive index 43 is provided on the light input side with respect to the liquid crystal layer 20, as with the liquid crystal display device according to the first embodiment and the like described above. This enables a further reduction in temperature. As illustrated in FIG. 31, there is refractive index distribution with a refractive index of 1.46, a thickness of 200 nm, and a size equal to the wiring shape in the second microlens ML2, and electric field distribution is further concentrated on the center of the aperture of the wiring layer 33.

Table 7 shows an example of optical parameters of the liquid crystal display device 10H3 according to Example 6-3. Meanings of the optical parameters shown in Table 7 are similar to those in Table 1. In addition, Table 8 shows various calculation parameters of the liquid crystal display device 10H3 according to Example 6-3. Meanings of the various calculation parameters shown in Table 8 are basically similar to those in Table 2. However, $f_4$ indicates a focal length in air of the fourth microlens ML4. $f_{34}$ indicates a combined focal length in air of the third microlens MU and the fourth microlens ML4. In addition, Table 9 shows the taking-in efficiency of the projection lens 121 and the absorptance of the liquid crystal display device, for the liquid crystal display device 100J according to Comparative Example 6-3 and the liquid crystal display device 10H3 according to Example 6-3.

TABLE 7

Example 6-3

| Type | Si | Ri[μm] | Conic | Di[μm] | Ni |
|---|---|---|---|---|---|
|  | 0 | ∞ |  | 0.1 | 1.46 |
| ML1 | 1 | 4.80 | −0.32295 | 3.2 | 1.67 |
|  | 2 | ∞ |  | 8.0 | 1.46 |
| ML2 | 3 | 3.72 |  | 2.8 | 1.8 |
| ITO | 4 | ∞ |  | 0.1 | 1.95 |
| Liquid crystal layer | 5 | ∞ |  | 3.3 | 1.55 |
| ITO | 6 | ∞ |  | 0.1 | 1.95 |
| Wiring layer | 7 | ∞ |  | 5.3 | 1.46 |
| C-Plate | 8 | ∞ |  | 4.3 | 1.67 |
| ML3 | 9 | ∞ |  | 2.4 | 1.8 |
|  | 10 | −5.70 |  | 0.5 | 1.46 |
| ML4 | 11 | ∞ |  | 2.4 | 1.8 |
|  | 12 | −5.70 |  | 5.0 | 1.46 |

TABLE 8

Example 6-3

| | |
|---|---|
| Image formation magnification | 1.03 |
| $f_1$[μm] | 22.6 |
| $f_2$[μm] | 10.9 |
| $f_{12}$[μm] | 9.4 |
| $f_3$[μm] | 16.6 |
| $f_4$[μm] | 16.6 |
| $f_{34}$[μm] | 8.8 |
| $t_{L12}$[μm] | 8.9 |
| $t_{L2\text{-}Wire}$[μm] | 3.8 |
| $t_{Wire\text{-}L3}$[μm] | 3.9 |
| $NA_{Wire}$ | 0.489 |
| $f_{12}/f_{34}$ | 107% |
| $t_{L2\text{-}Wire}/t_{Wire\text{-}L3}$ | 98% |
| $f_{12}/t_{L12}$ | 105% |

TABLE 9

| | Projection lens taking-in efficiency | Absorptance |
|---|---|---|
| Comparative Example | 65.0% | 18.4% |
| Example 6-3 | 78.9% | 7.6% |

The liquid crystal display device 10H3 according to Example 6-3 uses four microlenses. In this case, the following expression (E) roughly holds for the combined focal length $f_{12}$ of the first microlens ML1 and the second microlens ML2, the combined focal length $f_{34}$ of the third microlens ML3 and the fourth microlens ML4, and the interval $t_{L12}$ from the first microlens ML1 to the second microlens ML2. In the liquid crystal display device 10H3 according to Example 6-3, it is particularly possible to flatten the curvature of the microlens on the light output side, which makes it possible to improve manufacturability.

$$f_{12} = f_{34} = t_{L12} \tag{E}$$

Also in the liquid crystal display device 10H3 according to Example 6-3, it is apparent from Table 8 that the values of $f_{12}/f_{34}$, $t_{L2\text{-}Wire}/t_{Wire\text{-}L3}$, and $f_{12}/t_{L12}$ fall within ranges satisfying the conditional expressions (1) to (3) given above.

Example 6-4

FIG. 32 schematically illustrates a main part of a liquid crystal display device 10H4 according to Example 6-4. It is to be noted that FIG. 32 illustrates only a configuration of a portion corresponding to one pixel. In addition, FIG. 32 illustrates light rays based on ray tracing by ray tracing software.

The liquid crystal display device 10H4 according to Example 6-4 includes, in the optical axis direction, the first microlens ML1, the second microlens ML2, and the third microlens MU provided at a position corresponding to one pixel electrode 31, as with the liquid crystal display device 10H1 according to Example 6-1. In the liquid crystal display device 10H4 according to Example 6-4, the first microlens ML1 is provided on the light input side with respect to the liquid crystal layer 20. In the liquid crystal display device 10H4 according to Example 6-4, the second microlens ML2 and the third microlens MU are provided on the light output side with respect to the wiring layer 33. In the liquid crystal display device 10H4 according to Example 6-4, the C-plate 36 is provided between the second microlens ML2 and the wiring layer 33.

In the liquid crystal display device 10H4 according to Example 6-4, the first microlens ML1, the second microlens ML2, and the third microlens ML3 allow an entering bundle of light rays to form an image on the light output side with respect to the liquid crystal layer 20, as with the liquid crystal display device 10H1 according to Example 6-1. For example, the on-axis bundle of light rays L10 forms an image at the image formation position P30. In addition, in the configuration, the distance in air between the conjugate image formation positions of the image formation position on the light input side and the image formation position P30 on the light output side by the first microlens ML1, the second microlens ML2, and the third microlens ML3 is larger than the distance in air between the first microlens ML1 farthest on the light input side and the third microlens ML3 farthest on the light output side.

In the liquid crystal display device 10H4 according to Example 6-4, the step structure with the refractive index difference including the high refractive index layer 42 and the low refractive index 43 is provided on the light output side with respect to the wiring layer 33. This enables a further reduction in temperature. As illustrated in FIG. 32, there is refractive index distribution with a refractive index of 1.46, a thickness of 200 nm, and a size equal to the wiring shape in the second microlens ML2. It is to be noted that, as with the liquid crystal display device according to the first embodiment and the like described above, the step structure with the refractive index difference including the high refractive index layer 42 and the low refractive index 43 may be provided on the light input side with respect to the liquid crystal layer 20.

The liquid crystal display device 10H4 according to Example 6-4 has a configuration in which the configuration of the liquid crystal display device 10H1 according to Example 6-1 is flipped horizontally. Because light rays are regressive, it is possible to obtain effects similar to those of the liquid crystal display device 10H1 according to Example 6-1 even in a case where the liquid crystal display device 10H1 according to Example 6-1 is flipped horizontally. It is to be noted that optical parameters and various calculation parameters of the liquid crystal display device 10H4 according to Example 6-4 are omitted, because they are equivalent to those in a state in which the configuration of the liquid crystal display device 10H1 according to Example 6-1 is flipped horizontally.

In a case of the liquid crystal display device 10H4 according to Example 6-4, two microlenses are disposed on the light output side, and (the combined focal length of the two microlenses) (a lens interval between the two microlenses) holds on the light output side. Further, the refractive index difference structure is also disposed on the light output side. Therefore, two microlenses are present on the light output side with respect to the wiring layer 33, and the conditional expression (4) given above is satisfied for a combined focal length in air $f_{23}$ (=$f_{after}$) of the two microlenses, and a length in air $t_{L23}$ (=$t_{Lafterbetween}$) between the two microlenses on the light output side with respect to the wiring layer 33.

The liquid crystal display device 10H4 according to Example 6-4 has a configuration in which the liquid crystal display device 10H1 according to Example 6-1 is flipped horizontally. The values of $f_1/f_3$, $t_{L1\text{-}Wire}/t_{Wire\text{-}L2}$, and $f_{23}/t_{23}$ therefore fall within ranges satisfying the conditional expressions (1), (2), and (4) given above.

Example 6-5

FIG. 33 schematically illustrates a main part of a liquid crystal display device 10H5 according to Example 6-5. It is to be noted that FIG. 33 illustrates only a configuration of a portion corresponding to one pixel. In addition, FIG. 33 illustrates light rays based on ray tracing by ray tracing software.

The liquid crystal display device 10H5 according to Example 6-5 has a configuration similar to the liquid crystal display device 10H1 according to Example 6-1, except for the low refractive index layer 43 portion.

In the liquid crystal display device 10H5 according to Example 6-5, the low refractive index layer 43 has a tapered shape formed by air. The taper has a height of 8 μm, for example, and an opening shape (shape of a portion in contact with the liquid crystal layer 20) of the taper is equivalent to the wiring region. That is, the opening shape is equivalent to that in FIG. 29.

Table 9 shows the taking-in efficiency of the projection lens 121 and the absorptance of the liquid crystal display device, for the liquid crystal display device 100J according to Comparative Example 6-3 and the liquid crystal display device 10H5 according to Example 6-5. It is apparent from Table 9 that, the liquid crystal display device 10H5 according to Example 6-5 exhibits improvements in the taking-in efficiency and the absorptance, as compared with the liquid crystal display device 100J according to Comparative Example 6-3.

TABLE 9

|  | Projection lens taking-in efficiency | Absorptance |
| --- | --- | --- |
| Comparative Example | 65.0% | 18.4% |
| Example 6-5 | 77.8% | 5.8% |

6.3 Modification Examples

The liquid crystal display device according to the sixth embodiment allows various modifications to be made to the configuration described in each Example described above. For example, the number of microlenses may be even larger than three or four, and may be five or six. However, it is preferable that conditions similar to those in each Example described above hold even in that case. For example, it is preferable that the condition of "the combined focal length of the microlenses on the light input side with respect to the liquid crystal layer 20 is roughly equal to the combined focal length of the microlenses on the light output side with respect to the wiring layer 33" hold. In addition, it is preferable that the condition of "the combined focal length of the microlenses on the light input side with respect to the liquid crystal layer 20 is substantially equal to the length in air between the microlenses on the light input side with respect to the liquid crystal layer 20" hold. Alternatively, it is preferable that the condition of "the combined focal length of the microlenses on the light output side with respect to the wiring layer 33 is substantially equal to the length in air between the microlenses on the light output side with respect to the wiring layer 33" hold. In a case where the number of microlenses is increased, from the viewpoint of the combined focal length, there is an advantage that it is possible to obtain a desired short focal length without necessarily using a high refractive index material (e.g., even with n=1.7, etc.).

In addition, the height of the low refractive index layer 43 is not limited to 0.2 μm, and may be 0.4 μm or 0.1 μm. This is determined in accordance with a result of electromagnetic field analysis or manufacturing variation. In addition, the shape of the low refractive index layer 43 may be a shape precisely similar to the wiring shape, or may be a similar shape multiplied by some magnification (e.g., 95% to 110%, etc.). In addition, there is also an advantage that even the low refractive index layer 43 having a simple rectangular shape or the like produces an effect, which further facilitates manufacture. It is to be noted that the refractive index difference structure itself has also an effect of improving manufacturing robustness. Therefore, an effect of improving manufacturability is also expectable by including the refractive index difference structure.

Although each Example described above describes the configuration including the C-plate 36, a configuration excluding the C-plate 36 may be adopted. In this case, it is possible to shorten the lens interval between the microlens on the light input side with respect to the liquid crystal layer 20 and the microlens on the light output side with respect to the wiring layer 33, and further reduce the focal length of each microlens, thus further reducing the temperature. However, the contrast decreases. In addition, it is also possible to design the configuration with the C-plate 36 and the liquid crystal layer 20 replaced with each other. However, it is most efficient to position the wiring layer 33 at the center between the microlenses on both sides thereof. One reason for this is that rough symmetry is kept in this vicinity.

In addition, although the shape of the microlens is a shape that is flat on the wiring layer 33 side in all of Examples described above, this may also be reversed (may be convex toward the wiring layer 33 side). The shape of the microlens may be freely selected from the viewpoint of aberration, contrast, or manufacturability. Alternatively, the shape may be a biconvex shape.

In addition, the entry angle distribution is associated with wiring aperture. As the entry angle distribution is larger, it is necessary to make the wiring aperture larger, or to make the combined focal length of the microlens(es) on the light input side with respect to the liquid crystal layer 20 shorter. Therefore, these design values may be changed by making the entry angle distribution smaller. Similarly, because the taking-in efficiency of the projection lens 121 is dependent on the F-number of the projection lens 121, it is also possible to reduce the amount of heat by adopting a design with a smaller F-number.

In addition, each Example described above has the configuration in which the low refractive index layer 43 and the ITO (the common electrode 41) are in contact with each other. However, they may be slightly separated, and a $SiO_2$ layer may be present between the low refractive index layer 43 and the ITO. Alternatively, it is also possible to apply high/low refractive-index repeated layers onto the ITO, and the low refractive index layer 43 may be disposed thereon.

Other configurations, workings, and effects may be substantially similar to those of the liquid crystal display device according to the first embodiment described above.

7. APPLICATION EXAMPLES

The liquid crystal display device according to each embodiment described above is applicable to all types of displays (electronic apparatuses) including projection types or direct-viewing types.

Application Example 1

FIG. 34 schematically illustrates a configuration example of a transmissive projection display 1, as an electronic apparatus according to Application Example 1.

In the projection display 1, any of the transmissive liquid crystal display devices according to the first to fourth and sixth embodiments described above is built in liquid crystal display units (liquid crystal display units 10UR, 10UG, and 10UB).

The projection display 1 has a configuration of a so-called three-plate method that performs color image display using three plates of transmissive liquid crystal display units 10UR, 10UG, and 10UB. The projection display 1 includes a light source 211, a pair of a first multilens array integrator 212 and a second multilens array integrator 213, and a total reflection mirror 214. In the multilens array integrators 212 and 213, a plurality of microlenses 212M and a plurality of microlenses 213M are respectively arranged two-dimensionally. The multilens array integrators 212 and 213 serve to uniformize an illuminance distribution of light, and have a function to divide entering light into a plurality of small bundles of light rays.

The light source 211 emits white light including red light, blue light, and green light that are necessary for color image display. The light source 211 includes, for example, a light emitter (unillustrated) that emits the white light, and a concave mirror that reflects and collects the light emitted from the light emitter. Examples of the light emitter include a halogen lamp, a metal halide lamp, a xenon lamp, or the like. The concave mirror preferably has a shape ensuring high light-collecting efficiency, and is, for example, a spheroid mirror, a rotating parabolic mirror or the like having a rotationally symmetric surface shape. The light source 211 may include a laser light source, a fluorescent light source, an LED (Light-Emitting Diode) light source, or the like.

The projection display 1 further includes a PS combining element 215, a condenser lens 216, and a dichroic mirror 217 in this order on the light output side of the second multilens array integrator 213. The dichroic mirror 217 has a function to separate entering light into, for example, red light LR and other color light.

The PS combining element 215 is provided with a plurality of half-wave plates 215A at positions corresponding to locations between the adjacent microlenses on the second multilens array integrator 213. The PS combining element 215 has a function to separate entering light L0 into polarized light L01 and L02 of two types (P-polarized component and S-polarized component). Further, the PS combining element 215 has a function to output one of the two types of separated polarized light L01 and L02, i.e., the polarized light L02, from the PS combining element 215 while maintaining a polarization direction (for example, P polarization) of the polarized light L02, and to convert the other polarized light L01 (for example, S-polarized component) into another polarized component (for example, P-polarized component) through the action of the half-wave plate 215A and output the converted polarized light.

In addition, the projection display 1 includes a total reflection mirror 218, a field lens 224R, and the liquid crystal display unit 10UR in this order along an optical path of the red light LR separated by the dichroic mirror 217. The total reflection mirror 218 reflects the red light LR separated by the dichroic mirror 217 toward the liquid crystal display unit 10UR. The liquid crystal display unit 10UR has a function to spatially modulate the red light LR entering through the field lens 224R on the basis of an image signal.

The projection display 1 further includes a dichroic mirror 219 along an optical path of other color light separated by the dichroic mirror 217. The dichroic mirror 219 has a function to separate entering light into green light and blue light, for example.

In addition, the projection display 1 includes a field lens 224G and the liquid crystal display unit 10UG in this order along an optical path of green light LG separated by the dichroic mirror 219. The liquid crystal display unit 10UG has a function to spatially modulate the green light LG entering through the field lens 224G on the basis of the image signal. Further, the projection display 1 includes a relay lens 220, a total reflection mirror 221, a relay lens 222, a total reflection mirror 223, a field lens 224B, and the liquid crystal display unit 10UB in this order along an optical path of blue light LB separated by the dichroic mirror 219. The total reflection mirror 221 reflects the blue light LB entering through the relay lens 220 toward the total reflection mirror 223. The total reflection mirror 223 reflects the blue light LB reflected by the total reflection mirror 221 and entering through the relay lens 222 toward the liquid crystal display unit 10UB. The liquid crystal display unit 10UB has a function to spatially modulate the blue light LB reflected by the total reflection mirror 223 and entering through the field lens 224B on the basis of the image signal.

The projection display 1 also includes a cross prism 226 having a function to combine the red light LR, the green light LG, and the blue light LB at a position where the optical paths of these three types of color light intersect with each other. In addition, the projection display 1 includes a projection lens 227 for projecting combined light outputted from the cross prism 226 toward a screen 228. The cross prism 226 has three light entrance surfaces 226R, 226G, and 226B, and a single output surface 226T. The red light LR outputted from the liquid crystal display unit 10UR enters the light entrance surface 226R; the green light LG outputted from the liquid crystal display unit 10UG enters the light entrance surface 226G; and the blue light LB outputted from the liquid crystal display unit 10UB enters the light entrance surface 226B. The cross prism 226 combines the three types of color light that enter the light entrance surfaces 226R, 226G, and 226G, and outputs the combined light from the output surface 226T.

It is to be noted that the technology of the present disclosure is also applicable to a reflective projection display. In this case, it is possible to build in the reflective liquid crystal display device according to the fifth embodiment described above, as a reflective liquid crystal display unit in the reflective projection display.

Application Example 2

The liquid crystal display device according to each embodiment described above is also applicable to, in addition to the projection display, electronic apparatuses such as a television apparatus, a digital camera, a notebook-sized personal computer, a mobile terminal including a mobile phone and a smartphone, or a video camera.

FIG. 35 schematically illustrates an appearance configuration example of a television apparatus serving as an electronic apparatus according to Application Example 2.

The television apparatus has, for example, an image display screen section 300 including a front panel 310 and a filter glass 320. In the television apparatus, it is possible to configure the image display screen section 300 by using, for example, any of the transmissive liquid crystal display devices according to the first to fourth and sixth embodiments described above.

FIG. 36 and FIG. 37 schematically illustrate an appearance configuration example of a digital single-lens reflex camera 410 serving as an electronic apparatus according to Application Example 2. FIG. 36 illustrates the appearance configuration example on the front side of the digital single-lens reflex camera 410, and FIG. 37 illustrates the appearance configuration example on the rear side of the digital single-lens reflex camera.

The digital single-lens reflex camera 410 includes, for example, a main body section 411, a lens 412, a grip 413, a display section 414, a viewfinder 415, and the like. In the digital single-lens reflex camera 410, it is possible to configure the display section 414 or the viewfinder 415 by using, for example, any of the transmissive liquid crystal display devices according to the first to fourth and sixth embodiments described above.

FIG. 38 schematically illustrates a perspective configuration example of a head-mounted display 420 serving as an electronic apparatus according to Application Example 2.

The head-mounted display 420 includes, for example, an eyeglasses-type display section 421 and a supporting section 422. In the head-mounted display 420, it is possible to configure the display section 421 by using, for example, the liquid crystal display device according to any of the first to sixth embodiments described above.

8. OTHER EMBODIMENTS

The technology according to the present disclosure is not limited to the description of the embodiments described above, and various modifications may be made.

For example, the present technology may have the following configurations.

According to the present technology having the following configurations, the first layer and the second layer with the optimized refractive indices and shapes are provided between the counter substrate and the liquid crystal layer, which improves light utilization efficiency.

(1)

A liquid crystal display device including:
  a liquid crystal layer;
  a drive substrate including a light-shielding region and a transmissive region;
  a plurality of pixel electrodes that is transmissive and provided at a position corresponding to the transmissive region on the drive substrate;
  a counter substrate disposed to be opposed to the drive substrate with the plurality of pixel electrodes and the liquid crystal layer interposed therebetween;
  a first layer provided between the counter substrate and the liquid crystal layer and including a material having a first refractive index; and
  a second layer that is provided in at least a portion of a region corresponding to the light-shielding region in the first layer, includes a material having a second refractive index lower than the first refractive index, and has a rectangular cross-sectional shape in a thickness direction.

(2)

The liquid crystal display device according to (1), in which the cross-sectional shape of the second layer in the thickness direction has a width larger than a thickness thereof.

(3)

The liquid crystal display device according to (1) or (2), in which the second layer guides entering light to the plurality of pixel electrodes by a diffraction action.

(4)

The liquid crystal display device according to any one of (1) to (3), further including a common electrode provided between the liquid crystal layer and the first layer.

(5)

The liquid crystal display device according to any one of (1) to (4), further including a flat layer provided between the liquid crystal layer and the first layer and including the material having the second refractive index.

(6)

The liquid crystal display device according to any one of (1) to (5), further including a plurality of microlenses provided at respective positions corresponding to the plurality of pixel electrodes, between the first layer and the counter substrate.

(7)
The liquid crystal display device according to any one of (1) to (5), in which a surface of the first layer on the counter substrate side has a microlens shape at a position corresponding to each of the plurality of pixel electrodes.

(8)
The liquid crystal display device according to any one of (1) to (7), in which
the first layer includes a multilayer C-plate, and
the multilayer C-plate has the first refractive index as an average refractive index.

(9)
The liquid crystal display device according to any one of (1) to (8), in which the second layer is provided for at least a region, of the light-shielding region, corresponding to a diagonal direction in a pixel plane including the plurality of pixel electrodes.

(10)
The liquid crystal display device according to any one of (1) to (9), in which
the drive substrate includes a wiring layer, and
the light-shielding region includes a region corresponding to the wiring layer.

(11)
The liquid crystal display device according to any one of (1) to (10), in which
the drive substrate includes a wiring layer,
the liquid crystal display device further includes, in an optical axis direction, three or more microlenses provided at a position corresponding to each of the plurality of pixel electrodes,
at least one of the three or more microlenses is provided on each of a light input side with respect to the liquid crystal layer and a light output side with respect to the wiring layer,
the three or more microlenses allow an entering bundle of light rays to form an image on the light output side with respect to the liquid crystal layer, and
a distance in air between conjugate image formation positions of an image formation position on the light input side and an image formation position on the light output side by the three or more microlenses is larger than a distance in air between the microlens farthest on the light input side and the microlens farthest on the light output side, of the three or more microlenses.

(12)
The liquid crystal display device according to (11), in which a magnification of conjugate image formation by the three or more microlenses is equal to or more than 0.7 times and equal to or less than 1.3 times.

(13)
The liquid crystal display device according to (11) or (12), in which the following conditional expression is satisfied:

$$0.8 \leq f_{before}/f_{after} \leq 1.2 \quad (1), \text{where}$$

$f_{before}$: a combined focal length in air of the at least one microlens, of the three or more microlenses, provided on the light input side with respect to the liquid crystal layer; and $f_{after}$: a combined focal length in air of the at least one microlens, of the three or more microlenses, provided on the light output side with respect to the wiring layer.

(14)
The liquid crystal display device according to any one of (11) to (13), in which the following conditional expression is satisfied:

$$0.8 \leq t_{Lbefore-Wire}/t_{Wire-Lafter} \leq 1.2 \quad (2), \text{where}$$

$t_{Lbefore-Wire}$: a length in air from the microlens provided at a position closest to the wiring layer, of the at least one microlens provided on the light input side with respect to the liquid crystal layer, to the wiring layer; and $t_{Wire-Lafter}$: a length in air from the wiring layer to the microlens provided at a position closest to the wiring layer, of the at least one microlens provided on the light output side with respect to the wiring layer.

(15)
The liquid crystal display device according to any one of (11) to (14), in which
two of the three or more microlenses are provided on the light input side with respect to the liquid crystal layer, and
the following conditional expression is satisfied:

$$0.65 \leq f_{before}/t_{Lbeforebetween} \leq 1.35 \quad (3), \text{where}$$

$f_{before}$: a combined focal length in air of the two microlenses provided on the light input side with respect to the liquid crystal layer, and $t_{Lbeforebetween}$: a length in air between the two microlenses provided on the light input side with respect to the liquid crystal layer.

(16)
The liquid crystal display device according to any one of (11) to (14), in which
two of the three or more microlenses are provided on the light output side with respect to the wiring layer, and
the following conditional expression is satisfied:
where
$f_{after}$: a combined focal length in air of the two microlenses provided on the light output side with respect to the wiring layer; and $t_{Lafterbetween}$: a length in air between the two microlenses provided on the light output side with respect to the wiring layer.

(17)
The liquid crystal display device according to any one of (11) to (16), in which the following conditional expression is satisfied:

$$1.59/\varphi_{Wire} \leq n_{Wire} \cdot \sin \theta_{Wire} \quad (5), \text{where}$$

$n_{Wire}$: a refractive index of the wiring layer;
$\theta_{Wire}$: an angle of a light ray that passes through the wiring layer, and
$\varphi_{Wire}$: an inscribed circle diameter [μm] of a transmissive region at one of the pixel electrodes.

(18)
A liquid crystal display device including:
a liquid crystal layer;
a drive substrate;
a plurality of pixel electrodes that is reflective and provided on the drive substrate;
a counter substrate disposed to be opposed to the drive substrate with the plurality of pixel electrodes and the liquid crystal layer interposed therebetween;
a first layer provided between the counter substrate and the liquid crystal layer and including a material having a first refractive index; and a second layer that is provided in at least a portion of a region, in the first layer, corresponding to a location between the plurality of pixel electrodes, includes a material having a second refractive index lower than the first refractive index, and has a rectangular cross-sectional shape in a thickness direction.

(19) An electronic apparatus including a liquid crystal display device, the liquid crystal display device including:
a liquid crystal layer;
a drive substrate including a light-shielding region and a transmissive region;
a plurality of pixel electrodes that is transmissive and provided at a position corresponding to the transmissive region on the drive substrate;
a counter substrate disposed to be opposed to the drive substrate with the plurality of pixel electrodes and the liquid crystal layer interposed therebetween;
a first layer provided between the counter substrate and the liquid crystal layer and including a material having a first refractive index; and
a second layer that is provided in at least a portion of a region corresponding to the light-shielding region in the first layer, includes a material having a second refractive index lower than the first refractive index, and has a rectangular cross-sectional shape in a thickness direction.

(20) An electronic apparatus including a liquid crystal display device, the liquid crystal display device including:
a liquid crystal layer;
a drive substrate;
a plurality of pixel electrodes that is reflective and provided on the drive substrate;
a counter substrate disposed to be opposed to the drive substrate with the plurality of pixel electrodes and the liquid crystal layer interposed therebetween;
a first layer provided between the counter substrate and the liquid crystal layer and including a material having a first refractive index; and
a second layer that is provided in at least a portion of a region, in the first layer, corresponding to a location between the plurality of pixel electrodes, includes a material having a second refractive index lower than the first refractive index, and has a rectangular cross-sectional shape in a thickness direction.

This application claims the benefit of Japanese Priority Patent Application No. 2019-133827 filed with the Japan Patent Office on Jul. 13, 2019, and Japanese Priority Patent Application No. 2020-6346 filed with the Japan Patent Office on Jan. 17, 2020, the entire contents of each of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A liquid crystal display device, comprising:
a liquid crystal layer;
a drive substrate that includes a light-shielding region and a transmissive region;
a plurality of pixel electrodes that is transmissive and at a position corresponding to the transmissive region on the drive substrate;
a counter substrate opposite to the drive substrate with the plurality of pixel electrodes and the liquid crystal layer therebetween;
a first layer between the counter substrate and the liquid crystal layer, wherein the first layer includes a material having a first refractive index; and
a second layer in at least a portion of a region corresponding to the light-shielding region in the first layer, wherein
the second layer includes a material having a second refractive index lower than the first refractive index, and has a rectangular cross-sectional shape in a thickness direction, and
the second layer guides entering light to the plurality of pixel electrodes by a diffraction action.

2. The liquid crystal display device according to claim 1, wherein a width of the cross-sectional shape of the second layer in the thickness direction is larger than a thickness.

3. The liquid crystal display device according to claim 1, further comprising a common electrode between the liquid crystal layer and the first layer.

4. The liquid crystal display device according to claim 1, further comprising a flat layer between the liquid crystal layer and the first layer, wherein the flat layer includes the material having the second refractive index.

5. The liquid crystal display device according to claim 1, further comprising a plurality of microlenses at respective positions corresponding to the plurality of pixel electrodes, between the first layer and the counter substrate.

6. The liquid crystal display device according to claim 1, wherein a surface of the first layer on a side of the counter substrate has a microlens shape at a position corresponding to each of the plurality of pixel electrodes.

7. The liquid crystal display device according to claim 1, wherein
the first layer comprises a multilayer C-plate, and
the multilayer C-plate has the first refractive index as an average refractive index.

8. The liquid crystal display device according to claim 1, wherein the second layer is for at least a region, of the light-shielding region, corresponding to a diagonal direction in a pixel plane including the plurality of pixel electrodes.

9. The liquid crystal display device according to claim 1, wherein
the drive substrate includes a wiring layer, and
the light-shielding region comprises a region corresponding to the wiring layer.

10. The liquid crystal display device according to claim 1, wherein
the drive substrate includes a wiring layer,
the liquid crystal display device further comprises, in an optical axis direction, at least three microlenses at a position corresponding to each of the plurality of pixel electrodes,
at least one of the at least three microlenses is on each of a light input side with respect to the liquid crystal layer and a light output side with respect to the wiring layer,
the at least three microlenses allow an entering bundle of light rays to form an image on the light output side with respect to the liquid crystal layer, and
a distance in air between conjugate image formation positions of an image formation position on the light input side and an image formation position on the light output side by the at least three microlenses is larger than a distance in air between a microlens farthest on the light input side and a microlens arthest on the light output side, of the at least three microlenses.

11. The liquid crystal display device according to claim 10, wherein a magnification of conjugate image formation by the at least three microlenses is equal to or more than 0.7 times and equal to or less than 1.3 times.

12. The liquid crystal display device according to claim 10, wherein the following conditional expression is satisfied:

$$0.8 \leq f_{before}/f_{after} \leq 1.2 \quad (1),$$ where $f_{before}$ is a combined focal length in air of the at least one microlens, of the at least three microlenses, on the light input side with respect to the liquid crystal layer; and $f_{after}$ is a combined focal length in air of the at least one microlens, of the at least three microlenses, on the light output side with respect to the wiring layer.

13. The liquid crystal display device according to claim 10, wherein the following conditional expression is satisfied:

$$0.8 \leq t_{Lbefore\text{-}Wire}/t_{Wire\text{-}Lafter} \leq 1.2 \quad (2),$$ where $t_{Lbefore\text{-}Wire}$ is a length in air from the microlens at a position closest to the wiring layer, of the at least one microlens on the light input side with respect to the liquid crystal layer, to the wiring layer; and $t_{Wire\text{-}Lafter}$ is a length in air from the wiring layer to the microlens at a position closest to the wiring layer, of the at least one microlens on the light output side with respect to the wiring layer.

14. The liquid crystal display device according to claim 10, wherein
two microlenses of the at least three microlenses are on the light input side with respect to the liquid crystal layer, and
the following conditional expression is satisfied:

$$0.65 \leq f_{before}/t_{Lbeforebetween} \leq 1.35 \quad (3),$$ where $f_{before}$ is a combined focal length in air of the two microlenses on the light input side with respect to the liquid crystal layer, and $t_{Lbeforebetween}$ is a length in air between the two microlenses on the light input side with respect to the liquid crystal layer.

15. The liquid crystal display device according to claim 10, wherein
two of the at least three microlenses are on the light output side with respect to the wiring layer, and
the following conditional expression is satisfied:

$$0.65 \leq f_{after}/t_{Lafterbetween} \leq 1.35 \quad (4),$$ where $f_{after}$ is a combined focal length in air of the two microlenses on the light output side with respect to the wiring layer; and $t_{Lafterbetween}$ is a length in air between the two microlenses on the light output side with respect to the wiring layer.

16. The liquid crystal display device according to claim 10, wherein the following conditional expression is satisfied:

$$1.59/\varphi_{Wire} \leq n_{Wire} \cdot \sin \theta_{Wire} \quad (5),$$ where $n_{Wire}$ is a refractive index of the wiring layer;
$\theta_{Wire}$ is an angle of a light ray that passes through the wiring layer, and
$\varphi_{Wire}$ an inscribed circle diameter of a transmissive region at one of the pixel electrodes.

17. A liquid crystal display device, comprising:
a liquid crystal layer;
a drive substrate;
a plurality of pixel electrodes that is reflective and on the drive substrate;
a counter substrate opposite to the drive substrate with the plurality of pixel electrodes and the liquid crystal layer therebetween;
a first layer between the counter substrate and the liquid crystal layer, wherein the first layer includes a material having a first refractive index; and
a second layer in at least a portion of a region, in the first layer, corresponding to a location between the plurality of pixel electrodes, wherein
the second layer includes a material having a second refractive index lower than the first refractive index, and has a rectangular cross-sectional shape in a thickness direction, and
the second layer guides entering light to the plurality of pixel electrodes by a diffraction action.

18. An electronic apparatus, comprising:
a liquid crystal display device, wherein the liquid crystal display device comprises:
a liquid crystal layer;
a drive substrate that includes a light-shielding region and a transmissive region;
a plurality of pixel electrodes that is transmissive and at a position corresponding to the transmissive region on the drive substrate;
a counter substrate opposite to the drive substrate with the plurality of pixel electrodes and the liquid crystal layer therebetween;
a first layer between the counter substrate and the liquid crystal layer, wherein the first layer includes a material having a first refractive index; and
a second layer in at least a portion of a region corresponding to the light-shielding region in the first layer, wherein
the second layer includes a material having a second refractive index lower than the first refractive index, and has a rectangular cross-sectional shape in a thickness direction, and
the second layer guides entering light to the plurality of pixel electrodes by a diffraction action.

19. An electronic apparatus, comprising:
a liquid crystal display device, wherein the liquid crystal display device comprises:
a liquid crystal layer;
a drive substrate;
a plurality of pixel electrodes that is reflective and on the drive substrate;
a counter substrate opposite to the drive substrate with the plurality of pixel electrodes and the liquid crystal layer therebetween;
a first layer between the counter substrate and the liquid crystal layer, wherein the first layer includes a material having a first refractive index; and
a second layer in at least a portion of a region, in the first layer, corresponding to a location between the plurality of pixel electrodes, wherein
the second layer includes a material having a second refractive index lower than the first refractive index, and has a rectangular cross-sectional shape in a thickness direction, and
the second layer guides entering light to the plurality of pixel electrodes by a diffraction action.

* * * * *